(12) United States Patent
Kim et al.

(10) Patent No.: US 8,718,665 B2
(45) Date of Patent: May 6, 2014

(54) METHOD AND APPARATUS OF TRANSMITTING DATA IN COORDINATED MULTI-CELL WIRELESS COMMUNICATION SYSTEM

(75) Inventors: Hyung Tae Kim, Anyang-si (KR); Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 13/140,917

(22) PCT Filed: Jan. 21, 2010

(86) PCT No.: PCT/KR2010/000377
§ 371 (c)(1),
(2), (4) Date: Jun. 20, 2011

(87) PCT Pub. No.: WO2010/085092
PCT Pub. Date: Jul. 29, 2010

(65) Prior Publication Data
US 2011/0319092 A1 Dec. 29, 2011

Related U.S. Application Data

(60) Provisional application No. 61/146,622, filed on Jan. 22, 2009, provisional application No. 61/149,003, filed on Feb. 1, 2009, provisional application No. 61/170,088, filed on Apr. 16, 2009.

(30) Foreign Application Priority Data

May 15, 2009 (KR) ................ 10-2009-0042504

(51) Int. Cl.
*H04B 15/00* (2006.01)
*H04W 72/00* (2009.01)
*H04B 1/38* (2006.01)
*H04M 1/00* (2006.01)
*H04B 1/00* (2006.01)

(52) U.S. Cl.
USPC ...... 455/452.2; 455/63.1; 455/69; 455/452.1; 455/561; 455/562.1

(58) Field of Classification Search
USPC ............. 455/62, 63.4, 67.13, 69, 70, 88, 403, 455/418–420, 422.1, 423–425, 450–451, 455/452.1–452.2, 500–507, 509–510, 513, 455/522, 524–526, 550.1, 561, 63.1–63.2, 455/68, 434, 517, 556.2, 562.1; 370/310, 370/230, 235, 236, 328–329, 338–330, 341, 370/343–344

See application file for complete search history.

(56) References Cited

U.S. PATENT DOCUMENTS 8,280,444 B1 * 10/2012 Shen et al. ................ 455/562.1
2004/0225740 A1 11/2004 Klemba et al.
(Continued)

FOREIGN PATENT DOCUMENTS

KR 10-2007-0086976 A 8/2007
WO WO 2008/008691 A2 1/2008

*Primary Examiner* — Meless Zewdu
(74) *Attorney, Agent, or Firm* — Birch, Stewart, Kolasch & Birch, LLP

(57) ABSTRACT

A method and apparatus of transmitting data in a coordinated multi-cell wireless communication system is provided. A base station receives information about beam-forming vectors, aligned with a channel to a user equipment placed in a neighbor cell, and about nulling beam-forming vectors for the channel to the user equipment from the neighbor cell, determines a transmission beam-forming vector based on the information, and transmits data to the user equipment using the transmission beam-forming vector.

6 Claims, 11 Drawing Sheets

(56) References Cited

U.S. PATENT DOCUMENTS

| | | | |
|---|---|---|---|
| 2005/0099937 A1* | 5/2005 | Oh et al. | 370/207 |
| 2006/0120477 A1 | 6/2006 | Shen et al. | |
| 2007/0153714 A1* | 7/2007 | Shapira et al. | 370/310 |
| 2007/0160162 A1* | 7/2007 | Kim et al. | 375/267 |
| 2008/0075058 A1* | 3/2008 | Mundarath et al. | 370/342 |
| 2008/0139137 A1* | 6/2008 | Guo et al. | 455/101 |
| 2008/0144737 A1* | 6/2008 | Naguib | 375/299 |
| 2008/0273618 A1* | 11/2008 | Forenza et al. | 375/261 |
| 2009/0061842 A1* | 3/2009 | Park et al. | 455/422.1 |
| 2009/0264142 A1* | 10/2009 | Sankar et al. | 455/501 |
| 2010/0035555 A1* | 2/2010 | Bala et al. | 455/63.1 |
| 2010/0279729 A1* | 11/2010 | Hui et al. | 455/522 |

* cited by examiner

METHOD AND APPARATUS OF TRANSMITTING DATA IN COORDINATED MULTI-CELL WIRELESS COMMUNICATION SYSTEM

CROSS REFERENCE TO RELATED APPLICATIONS

This application is the National Phase of PCT/KR2010/000377 filed on Jan. 21, 2010, which claims priority under 35 U.S.C. 119(e) to U.S. Provisional Application No. 61/146,622 filed on Jan. 22, 2009, U.S. Provisional Application No. 61/149,003 filed on Feb. 1, 2009, and U.S. Provisional Application No. 61/170,088 filed on Apr. 16, 2009 and under 35 U.S.C. 119(a) to Patent Application No. 10-2009-0042504 filed in the Republic of Korea on May 15, 2009, all of which are hereby expressly incorporated by reference into the present application.

TECHNICAL FIELD

The present invention relates to wireless communication, and more particularly, to a method and apparatus of transmitting data in a coordinated multi-cell wireless communication system.

BACKGROUND ART

A wireless communication system includes a Base Station (BS) and one or more User Equipments; (UEs). The user equipment can be fixed or mobile and can be referred to as another terminology, such as a Mobile Station (MS), a User Terminal (UT), a Subscriber Station (SS), or a wireless device. In general, the base station refers to a fixed station that communicates with the user equipments, and it can be referred to as another terminology, such as a Node-B, a Base Transceiver System (BTS), or an access point. Hereinafter, uplink (UL) transmission refers to transmission from a user equipment to a base station, and downlink (DL) transmission refers to transmission from a base station to a user equipment.

A wireless communication system has a cell structure in order to configure an efficient system. The cell refers to an area subdivided from a wide area in order to efficiently use the frequency. In general, a base station is deployed at the center of a cell in order to relay user equipments, and the cell refers to a service area in which one base station is deployed.

The next-generation multimedia wireless communication systems which are recently being actively researched are required to process various pieces of information, such as video and wireless data, in addition to the early voice-centered service with a higher data transmission rate.

Orthogonal Frequency Division Multiplexing (OFDM) having a high data transmission rate has recently been in the spotlight. The OFDM is a multi-carrier modulation scheme for dividing a frequency band into a number of orthogonal subcarriers and transmitting data in the divided frequency bands. Orthogonal Frequency Division Multiple Access (OFDMA) is a scheme for providing multiplexing of a multi-user by combining Frequency Division Multiple Access (FDMA), Time Division Multiple Access (TDMA), or Code Division Multiple Access (CDMA) with OFDM.

If neighbor cells of the OFDM/OFDMA systems use the same subcarrier in a multi-cell environment, it can become a cause of interference to users. This phenomenon is called inter-cell interference. In particular, the inter-cell interference becomes a big problem to user equipments placed near the boundaries of the cells. In downlink transmission, a user equipment placed near the boundary of a cell is subject to strong interference resulting from neighbor cells. In uplink transmission, a user equipment placed near the boundary of a cell provides strong interference with neighbor cells and has a low transmission rate because of the loss of a path in a serving cell.

To reduce such inter-cell interference, neighbor cells can use different subcarriers. This method is however problematic in that radio resources that can be used by the base stations of respective cells are reduced.

A coordinated multi-cell method has been proposed in order to reduce such inter-cell interference in a multi-cell environment. If the coordinated multi-cell method is used, the performance of communication of a user equipment placed near the boundary of a cell can be improved. Discussions on a method of transmitting and processing data using the coordinated multi-cell method are in progress.

DISCLOSURE OF INVENTION

Technical Problem

The coordinated multi-cell method can be classified into several types depending on the level of information shared between neighbor cells. A coordinated multi-cell can be referred to as another terminology, such as a coordinated multi-point, a CoMC, or CoMP. In theory, to share lots of data between neighbor cells as much as possible is advantageous to improve the performance of a system. However, to share data, additional signal information has to be defined between a base station and a user equipment and between base stations. Accordingly, lots of problems, such as the use of additional bandwidths and time delay in information transfer, are generated in real implementations. In particular, an additional controller must be provided on the upper side of base stations which participate in coordination in the case in which transmission data of the base stations are shared, and centralizing scheduling for determining which base station will transmit which data and how much data must be performed. Therefore, there are problems in that control signals are further increased and extensibility and environment adaptation are reduced. Accordingly, a method is practically preferred in which base stations coordinate with each other through the exchange of a minimum number of control signals in the state in which data are not shared between neighbor cells.

There is a beam avoidance method from among methods of lowering the degree of interference resulting from neighbor cells by making the neighbor cells share channel information. In the beam avoidance method, the degree of interference is lowered by restricting a Precoding Matrix Indicator (PMI) which can be selected by a neighbor cell. According to a typical beam avoidance method, a user equipment measures a Signal to Interference and Noise Ratio (SINR) for all PMIs of neighbor cells and feeds back the degree of preference of each neighbor cell to a PMI to a base station. For example, the user equipment can feed back a preferred PMI set (that is, a PMI set for neighbor cells providing less interference) or a non-preferred PMI set (that is, a PMI set for neighbor cells providing much interference) to the base station. A neighbor cell participating in coordination can perform beam-forming with consideration taken of the degree of preference of a user equipment to a PMI in order to lower the degree of interference for the corresponding user equipment. In this case, a base station must know the SINR for each PMI because a reception SINR of the user equipment can be changed depending on which PMI is selected by the neighbor cell.

Accordingly, the user equipment must feedback not only the degree of preference for a PMI, but the SINR for each PMI to the base station.

In another example of the beam avoidance method, a user equipment is required to define the strongest interference beam-forming vector and to perform beam-forming using another beam-forming vector other than the beam-forming vector. Here, the strongest interference beam-forming vector can be defined as a beam-forming vector having the highest correlation value with a singular vector which has the greatest value, from among right singular vectors which are obtained by performing Singular Value Decomposition (SVD) on a channel between a base station and a user equipment of a neighbor cell. In this case, the base station does not know that a neighbor cell has used which beam-forming vector. Accordingly, to determine a Modulation and Coding Scheme (MCS) level, the base station must have known the SINR for all the codebooks of the neighbor cell.

As described above, according to the beam avoidance method, a user equipment must transmit a large amount of feedback information to a base station. It acts as a big overhead to the user equipment.

Accordingly, the present invention has been made in view of the above problems, and it is an object of the present invention to provide a method of transmitting data, which is capable of reducing inter-cell interference using a coordinated multi-cell method. In particular, the present invention provides a method capable of improving the performance of a user equipment placed near the boundary of a cell, enhancing the throughput of an overall system, and reducing overhead to a user equipment.

Solution to Problem

In an aspect, a data transmission method of a base station in a coordinated multi-cell wireless communication system is provided. The data transmission method include receiving information about beam-forming vectors, aligned with a channel to a user equipment placed in a neighbor cell, and about nulling beam-forming vectors for the channel to the user equipment from the neighbor cell, determining a transmission beam-forming vector based on the information, and transmitting data to the user equipment using the transmission beam-forming vector. The channel may be an effective channel in which a reception beam-forming vector of the user equipment has been taken into consideration. The transmission beam-forming vector may be not a beam-forming vector aligned with the channel to the user equipment placed in the neighbor cell. The transmission beam-forming vector may be selected from the beamforming vectors orthogonal to the beam-forming vectors aligned with the channel to the user equipment placed in the neighbor cell. The transmission beam-forming vector may be determined using Zero Forcing (ZF) beam-forming. The data may be received from the neighbor cell, and the data comprise data for the user equipment placed in the neighbor cell. The information about the beam-forming vectors may be transmitted by a base station of the neighbor cell or by the user equipment placed in the neighbor cell.

In another aspect, a communication method of a base station in a coordinated multi-cell wireless communication system is provided. The communication method include receiving channel information and information about beam-forming vectors, aligned with a channel between a user equipment and a neighbor cell, from the user equipment, and transmitting the information about the beam-forming vectors, aligned with the channel between the user equipment and the neighbor cell, to the neighbor cell. The channel information may include a Signal to Interference and Noise Ratio (SINR) experienced by the user equipment with no interference from the neighbor cell. The communication method may further include transmitting data to the user equipment at a transmission rate set based on the SINR. The channel information may include an SINR experienced by the user equipment if the neighbor cell uses the beam-forming vectors, aligned with the channel between the user equipment and the neighbor cell, as a transmission beam-forming vector. The communication method may further include receiving information about a transmission beam-forming vector, used by a base station of the neighbor cell, from the neighbor cell, and calculating an SINR experienced by the user equipment if the base station of the neighbor cell transmits downlink data using the transmission beam-forming vector. The transmission beam-forming vector may be selected by the base station of the neighbor cell based on the information about the beam-forming vectors aligned with the channel between the user equipment and the neighbor cell.

In another aspect, a communication method of a user equipment in a coordinated multi-cell wireless communication system is provided. The communication method include extracting information about a first beam-forming vector, aligned with a channel to a neighbor cell, or a first nulling beam-forming vector for the channel to the neighbor cell from signals received from the neighbor cell, extracting information about a second beam-forming vector, aligned with channel to a serving cell, from signals received from the serving cell, and transmitting the information about the first beam-forming vector to a serving base station or a neighbor base station, and transmitting the information about the second beam-forming vector to the serving base station. The channel to the neighbor cell and the channel to the serving cell may include effective channels in which reception beam-forming vectors of the user equipment are taken into consideration. The communication method may further include transmitting channel information to the base station. The channel information may include at least one of an SINR experienced by the user equipment with no interference from the neighbor cell and an SINR experienced by the user equipment when the neighbor cell uses the first beam-forming vector aligned with the channel to the neighbor cell.

Advantageous Effects of Invention

According to the present invention, the interference of a neighbor cell with user equipments placed at the boundaries of cells can be reduced. In particular, a feedback overhead to a user equipment can be reduced because the user equipment does not need to transmit channel information about all the codebooks of a neighbor cell to a base station.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
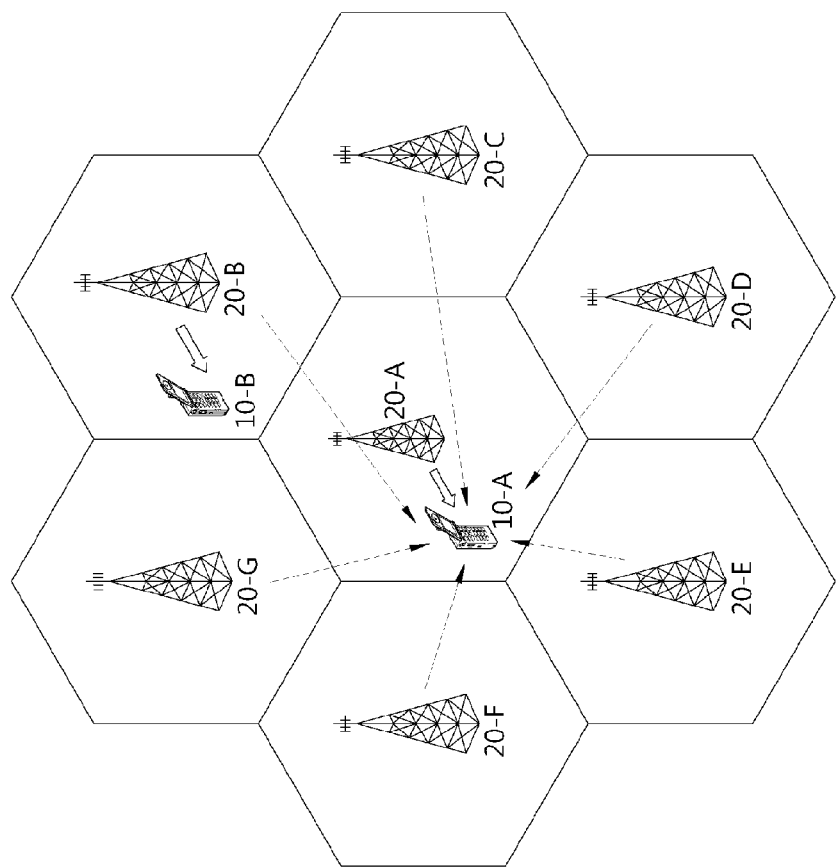
FIG. 1 is an exemplary diagram showing a wireless communication system in a multi-cell environment.

FIG. 1 is an exemplary diagram showing a wireless communication system in a multi-cell environment.

Referring to FIG. 1, the wireless communication system includes a base station 20 and at least one user equipment 10. The wireless communication system can be an OFDM or OFDMA-based system. The OFDM system uses a number of orthogonal subcarriers. The OFDM system is implemented using Inverse Fast Fourier Transform (IFFT) and Fast Fourier Transform (FFT). A transmitter performs IFFT on data and transmits the resulting data. A receiver restores original data by performing FFT on a reception signal. A transmitter uses IFFT in order to combine a number of subcarriers. A receiver uses corresponding FFT in order to split a number of subcarriers. In downlink, a transmitter can be a part of the base station 20, and a receiver can be a part of the user equipment 10. In uplink, a transmitter can be a part of the user equipment 10, and a receiver can be a part of the base station 20.

One or more cells can exist in the base station 20. The cell is an area in which one base station 20 provides communication service. A multi-cell can include a plurality of base stations each having at least one cell. A base station that provides the user equipment 10 with communication service is called a serving base station (Serving BS), and a base station neighboring a serving base station is called a neighbor base station (Neighbor BS). The cell of a serving base station is called a serving cell, and the cell of a neighbor base station is called a neighbor cell.

It is assumed that a base station A 20-A provides a user equipment A 10-A with communication service, and a base station B 20-B provides a user equipment B 10-B with communication service. With respect to the user equipment A 10-A, the base station A 20-A is a serving base station, and the base station B 20-B is a neighbor base station. With respect to the user equipment B 10-B, the base station B 20-B is a serving base station, and the base station A 20-A is a neighbor base station. It is assumed that the user equipment A 10-A and the user equipment B 10-B are placed at the boundaries of respective serving cells. The base station B 20-B assigns radio resources to the user equipment B 10-B through scheduling and transmits downlink data DL DATA to the user equipment B 10-B. The downlink data transmitted by the base station B 20-B may be received by not only the user equipment B 10-B, but the user equipment A 10-A. Accordingly, the downlink data transmitted by the base station B 20-B can act as great interference to the user equipment A 10-A. In the OFDMA system, user equipments using different frequency bands within the same cell do not interfere with each other because orthogonality is guaranteed between frequency domains. However, user equipments using the same frequency band in respective neighbor cells can interfere with each other because orthogonality is not guaranteed between frequency domains. In the case in which the base station A 20-A and the base station B 20-B coordinate with each other, the antennas of respective base stations are operated with consideration taken of user equipments placed in other cells. It can be considered as a multi-antenna system in which the antennas are spread in several cells. Accordingly, a method in which the base station A 20-A and the base station B 20-B coordinate with each other can be called a coordinated multi-cell method.

Figure 2:
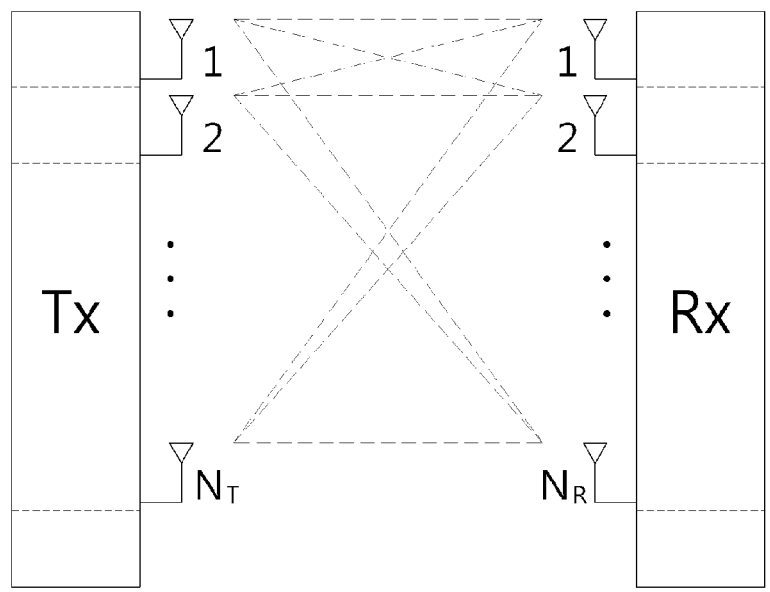
FIG. 2 shows a general configuration of a wireless communication system having a multi-antenna.

FIG. 2 shows the configuration of a wireless communication system having a known multi-antenna.

Referring to FIG. 2, the number of transmission antennas is $N_T$, and the number of reception antennas is $N_R$. The amount of data transmitted by a channel is theoretically increased in proportion to the number of antennas. Accordingly, the transmission rate can be enhanced, and the efficiency of frequency can be significantly improved. With an increase in the amount of data transmitted by a channel, the transmission rate can be theoretically increased by a value in which a maximum transmission rate $R_o$ when a single antenna is used is multiplied by a rate increment $R_i$.

MathFigure 1

$$R_i = \min(N_T, N_R) \qquad \text{[Math.1]}$$

For example, in a Multiple Input Multiple Output (MIMO) communication system using four transmission antennas and four reception antennas, the transmission rate which is theoretically four times as compared with a single antenna system can be obtained. After such a theoretical increase in the capacity of a multi-antenna system was established in the mid-1990s, active research is being carried out on a variety of techniques for improving the data transmission rate based on the theoretical increase in the capacity. Of them, several techniques have already been reflected in the standards of various wireless communications, such as the third generation mobile communication and the next-generation wireless LAN.

In the recent trend of researches pertinent to a multi-antenna, active research is being carried out on an information theory, which is related to the calculation of the capacity of multi-antenna communication in various channel environments and multi-access environments, the measurement of a radio channel and the induction of a radio channel model of a multi-antenna system, and time-space signal processing technology for improving the reliability of transmission and a transmission rate from various angles.

A communication method in the multi-antenna system is described in more detail using mathematical modeling. It is assumed that the multi-antenna system includes an $N_T$ number of transmission antennas and an $N_R$ number of reception antennas.

In relation to transmission signals, assuming that there are an $N_T$ number of the transmission antennas, a maximum number of information that can be transmitted is $N_T$. Transmission information can be expressed as follows.

MathFigure 2

$$s = [s_1, s_2, \ldots, s_{N_T}]^T \qquad \text{[Math.2]}$$

Pieces of transmission information $$s_1, s_2, \ldots, s_{N_T}$$

can have different transmission powers. Here, the superscript T indicates a transpose operator. A row vector is switched into a column vector and a column vector is switched into a row vector through a transpose operation. Assuming that transmission powers are $$P_1, P_2, \ldots, P_{N_T},$$

respectively, the pieces of transmission information with adjusted transmission powers can be expressed as follows.

MathFigure 3

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Math.3]}$$

Further, an information vector $$\hat{s}$$

can be expressed as follows using a diagonal matrix P of the transmission power.

MathFigure 4

$$\hat{s} = \begin{bmatrix} P_1 & & 0 \\ & P_2 & \\ & & \ddots \\ 0 & & & P_{N_T} \end{bmatrix} \begin{bmatrix} s_1 \\ s_2 \\ \vdots \\ s_{N_T} \end{bmatrix} = Ps \qquad \text{[Math. 4]}$$

A case in which a weight matrix W is applied to the information vector $$\hat{s}$$

with an adjusted transmission power, and an $N_T$ number of transmission signals $$x_1, x_2, \ldots, x_{N_T}$$

are configured is taken into consideration. The weight matrix W functions to properly distribute the pieces of transmission information into the respective antennas according to transmission channel conditions, etc. The transmission signals $$x_1, x_2, \ldots, x_{N_T}$$

can be expressed as follows using a vector X.

MathFigure 5

$$x = \begin{bmatrix} x_1 \\ x_2 \\ \vdots \\ x_i \\ \vdots \\ x_{N_T} \end{bmatrix} \qquad \text{[Math. 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix}$$

$$= \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

Here, $w_{ij}$ refers to a weight between an $i^{th}$ transmission antenna and $j^{th}$ information. The weight matrix W is also called a precoding matrix.

In the case in which there are an $N_R$ number of reception antennas, reception signals $$y_1, y_2, \ldots, y_{N_R}$$

of the respective antennas can be expressed as follows using a vector.

MathFigure 6

$$y = [y_1, y_2, \ldots, y_{N_R}]^T \qquad \text{[Math.6]}$$

In the case in which channels are modeled in a multi-antenna wireless communication system, the channels can be classified according to their transmission/reception antenna indices. It is assumed that a channel from a transmission antenna j to a reception antenna i is indicated by $h_{ij}$. In $h_{ij}$, it should be noted that the index of a reception antenna is first and the index of a transmission antenna is late.

Figure 3:
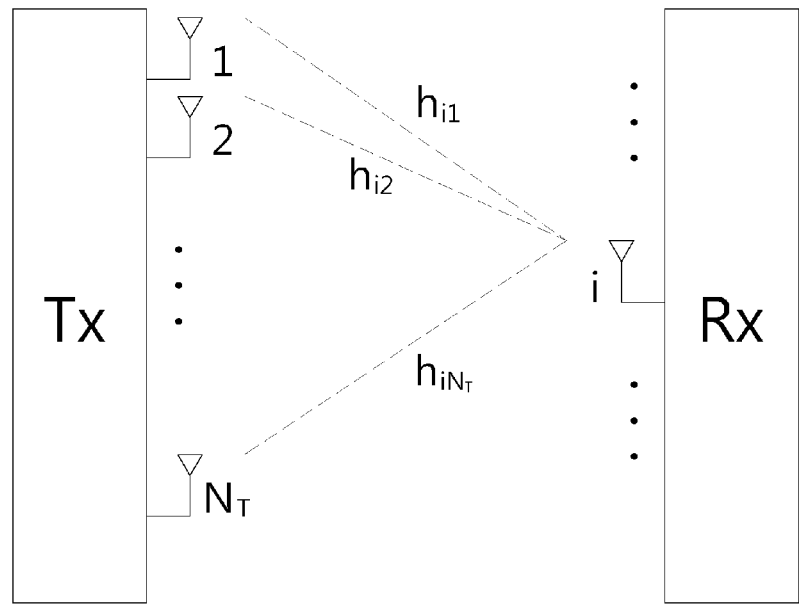
FIG. 3 shows channels from an $N_T$-number of transmission antennas to a reception antenna i.

FIG. 3 shows channels from an $N_T$ number of transmission antennas to a reception antenna i. The channels can be bundled and expressed in the form of a vector and a matrix. In FIG. 3, the channels from a total $N_T$ number of the transmission antennas to the reception antenna i can be expressed as follows.

MathFigure 7

$$h_i^T = [h_{i1}, h_{i2}, \ldots, h_{iN_T}] \qquad \text{[Math.7]}$$

Accordingly, all the channels from an $N_T$ number of the transmission antennas to an $N_R$ number of the reception antennas can be expressed as follows.

MathFigure 8

$$H = \begin{bmatrix} h_1^T \\ h_2^T \\ \vdots \\ h_i^T \\ \vdots \\ h_{N_R}^T \end{bmatrix} \quad \text{[Math. 8]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$

In an actual channel, Additive White Gaussian Noise (AWGN) is added after a channel matrix H is performed. AWGNs $$n_1, n_2, \ldots, n_{N_R}$$

respectively added to an $N_R$ number of the reception antennas can be expressed as follows.

MathFigure 9

$$n = [n_1, n_2, \ldots, n_{N_R}]^T \quad \text{[Math.9]}$$

The reception signals can be expressed as follows through the above-described numerical modeling.

MathFigure 10

$$y = \begin{bmatrix} y_1 \\ y_2 \\ \vdots \\ y_i \\ \vdots \\ y_{N_R} \end{bmatrix} \quad \text{[Math. 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

If the channel matrix H is subject to Singular Value Decomposition (SVD), it results in the following equation.

MathFigure 11

$$H = UDV^H \quad \text{[Math. 11]}$$

$$= U \begin{bmatrix} \sqrt{\lambda_1} & 0 & \cdots & 0 \\ 0 & \sqrt{\lambda_2} & \cdots & 0 \\ \vdots & \vdots & \ddots & \vdots \\ 0 & \cdots & 0 & \sqrt{\lambda_m} \end{bmatrix} V^H.$$

The matrices U (or $U^H$) and V (or $V^H$) are unitary matrices, and the matrix D is a diagonal matrix in which only elements in the diagonal line have values and the values of the remaining elements are 0. The unitary matrix U or V is multiplied by its Hermitian matrix $U^H$ or $V^H$, resulting in an identity matrix. Theoretically, a transmitter transmits a signal multiplied by the unitary matrix V, and a receiver multiplies a reception signal by the Hermitian matrix $U^H$. A channel between the transmitter and the receiver can be simply interpreted as $U^H UDV^H V = D$ through such signal processing. In the transmitter, a process of multiplying a signal by the unitary matrix V is called precoding. In the receiver, a process of multiplying a reception signal by the Hermitian matrix $U^H$ is called post coding. From a viewpoint of implementations, the transmitter and the receiver, in general, previously define the matrices V and $U^H$ in order to reduce the degree of system complexity. It is impossible for a transmitter and a receiver to have all matrices V and $U^H$ corresponding to actual channels. Thus, each of a transmitter and a receiver has a limited number of the matrices V and $U^H$, which is called a codebook. The performance of a multi-antenna wireless communication system and a channel between a transmitter and a receiver can be varied depending on actual matrices used in the precoding and post coding processes. A matrix/vector multiplied in the precoding process is called a precoding matrix/vector or a transmission beam-forming matrix/vector. Further, a matrix/vector multiplied in the post coding process is called a post coding matrix/vector or a reception beam-forming matrix/vector.

In a multi-antenna wireless communication system, a receiver for demodulating multiple data streams transmitted by a multi-antenna can include a Zero-Forcing (ZF) receiver, a Minimum Mean Square Error (MMSE) receiver, etc.

The ZF receiver is configured to find a first transmission signal by performing an inverse matrix operation of a channel matrix H, estimated from each of antennas, on each of a plurality of reception signals received from the respective antennas.

The MMSE receiver is an advanced version of the ZF receiver and is configured to perform an operation having the least error with consideration taken of both interference between channels and an increase in the noise, which are generated in a channel matrix H with respect to a reception signal, by taking noise components into consideration when performing an inverse matrix operation.

The above description has placed importance on a case in which the multi-antenna communication system is used by a single user. However, a multi-user diversity can be obtained by applying the multi-antenna communication system to a plurality of users. This is described below in short.

A fading channel is one of the major causes to deteriorate the performance of a wireless communication system. A channel gain varies depending on time, frequency, and space, and the deterioration of performance becomes severe with a reduction in the channel gain. A diversity scheme (that is, one of the methods capable of overcoming fading) is based on the fact that there is a very low probability that all several independent channels can have low gains. A variety of diversity schemes are possible, and a multi-user diversity scheme is one of the diversity schemes.

Assuming that several users exist within a cell, there is a very low probability that all the users can have low gains because the channel gains of the respective users are independent from each other in terms of probability. According to the information theory, assuming that several users exist within a cell and the transmission power of a base station is sufficient, the total capacity of channels can be maximized when all the channels are assigned to a user having the highest channel gain. The multi-user diversity scheme can be classified into three kinds.

A time multi-user diversity scheme is used to assign channels to a user having the highest gain value in the case in which channels are changed according to time. A frequency multi-user diversity scheme is used to assign subcarriers to a user having a maximum gain in each frequency band in a frequency multi-carrier system, such as OFDM (Orthogonal Frequency Division Multiplexing).

If channels are changed very slowly in a system not using a multi-carrier, a user having the highest channel gain will occupy the channels for a long time, and so the remaining users cannot perform communication. In this case, to use the multi-user diversity scheme, it is necessary to induce a change in the channel.

A space multi-user diversity scheme is based on the fact that, in general, the channel gains of users differ according to space. An implementation example of the space multi-user diversity scheme is a Random BeamForming (RBF) method. The RBF method is also called an "opportunistic beam-forming" method. In this method, beam-forming is performed at a transmission stage through a specific weight using a multi-antenna, thereby inducing a change in the channels.

A Multi-User MIMO (MU-MIMO) method which uses the above multi-user diversity scheme in the multi-antenna method is described below.

In the MU-MIMO method, the number of users and the number of antennas of each of the users can have several combinations at transmission and reception stages. The MU-MIMO method is described from a viewpoint of downlink (forward link) and uplink (reverse link). Downlink refers to a case in which a base station transmits signals to several user equipments. Uplink refers to a case in which several user equipments transmit signals to a base station.

In the case of downlink, as extreme cases, a single user can receive signals through a total $N_R$ number of reception antennas, and a total $N_R$ number of users can receive signals through respective antennas. Alternatively, an intermediate combination of both the extreme cases is also possible. In other words, a combination in which a specific user uses a single reception antenna, whereas a specific user uses three reception antennas is possible. It should be noted that in which combination, a total number of the reception antennas is constant (that is, $N_R$). Such a case is commonly called a MIMO Broadcast Channel (BC) or Space Division Multiple Access (SDMA).

In the case of uplink, as extreme cases, a single user can transmit signals through a total $N_T$ number of transmission antennas, and a total $N_T$ number of users can transmit signals through respective antennas. Alternatively, an intermediate combination of both the extreme cases is also possible. In other words, a combination in which a specific user uses a single transmission antenna, whereas a specific user uses three transmission antennas is possible. It should be noted that in which combination, a total number of the transmission antennas is constant (that is, $N_T$). Such a case is commonly called a MIMO Multiple Access Channel (MAC). Uplink and downlink have a symmetrical relationship, and so a scheme used on one side can also be used on the other side.

Meanwhile, the number of rows and columns of the channel matrix H, indicative of a channel state, is determined by the number of transmission/reception antennas. In the channel matrix H, the number of rows is equal to the number $N_R$ of reception antennas, and the number of columns is equal to the number $N_T$ of transmission antennas. That is, the channel matrix H is $N_R*N_T$.

The rank of a matrix is defined as a minimum number from among the number of independent rows or columns. Accordingly, the rank of a matrix cannot be greater than the number of rows or columns. The rank H of a channel matrix H is restricted as follows.

MathFigure 12

$$\text{rank}(H) \leq \min(N_T, N_R) \qquad [\text{Math.12}]$$

The rank can be defined as the number of unique values which are not 0, assuming that a matrix is subject to eigenvalue decomposition. In a similar way, the rank can be defined as the number of unique values which are not 0, assuming that a matrix is subject to SVD (singular value decomposition). Accordingly, in the channel matrix H, the physical meaning of a rank can be said to be a maximum number in which different pieces of information can be transmitted in a given channel.

Figure 4:
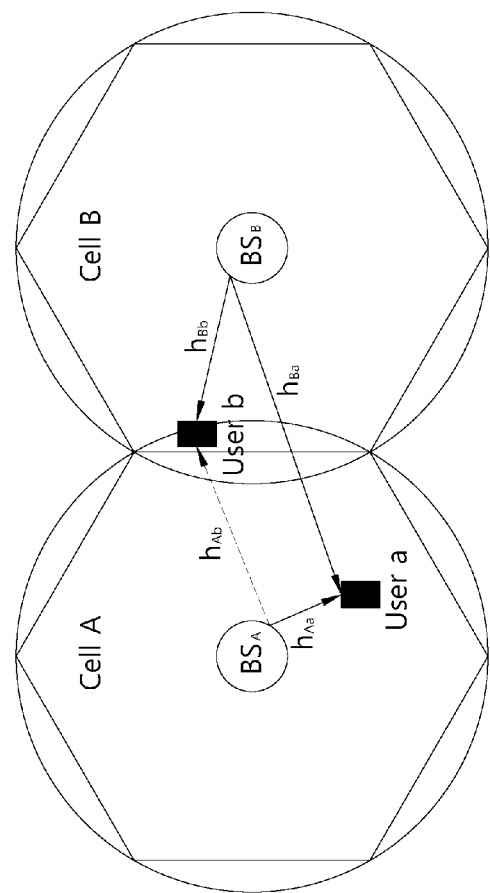
FIG. 4 is a diagram illustrating two neighbor cells.

FIG. 4 is a diagram illustrating two neighbor cells. Although a case in which the two cells coordinate with each other is illustrated for convenience of description, the present invention is not limited to the above case. For example, the present invention can also be applied to a case in which three or more cells coordinate with each other. Further, the present invention can be applied to not only a Single User MIMO (SU-MIMO) method, but an MU-MIMO method.

Referring to FIG. 4, a user equipment a (User a) is placed at the center of a cell A, and a user equipment b (User b) is placed at the boundary of a cell B. A base station A ($BS_A$) is the base station of the cell A, and a base station B ($BS_B$) is the base station of the cell B. From a standpoint of the user equipment a, the cell A is a serving cell, and the cell B is a neighbor cell. From a standpoint of the user equipment b, the cell B is a serving cell, and the cell A is a neighbor cell. The user equipment b can experience strong interference resulting from the cell A because it is placed at the boundary of the cell B. A channel providing strong interference is indicated by a dotted line in FIG. 4, and one of the objects of the present invention is to remove or weaken such strong interference through coordination between the cells. The user equipment a can experience relatively weak interference resulting from the cell B because it is placed at the center of the cell A. The user equipment a and the user equipment b can use the same time and the same frequency band, can interfere with each other, and can receive downlink data. The cell A and the cell B can share scheduling information about time and frequency resources. It is assumed that the cell A is a coordination cell which makes an effort to reduce downlink interference affecting the user equipment b. A channel between the base station A $BS_A$ and the user equipment a is indicated by $h_{Aa}$, a channel between the base station A $BS_A$ and the user equipment b is indicated by $h_{Ab}$, a channel between the base station B $BS_B$ and the user equipment a is indicated by $h_{Ba}$, and a channel between the base station B $BS_B$ and the user equipment b is indicated by $h_{Bb}$.

Hereinafter, a method of reducing interference influenced by the user equipment b placed at the boundaries of the cell A and the cell B when the cell A transmits downlink data. The following items are assumed.

First, a neighbor cell (hereinafter referred to as a cell A) is not allowed to use a full rank. If the cell A uses the full rank, interference affecting a serving cell (hereinafter referred to as a cell B) is identical although which precoding matrix is used. In the case in which the cell A is a coordination cell making an effort to reduce interference with the cell B, it is assumed that the cell A is not allowed to use the full rank.

Second, the reception beam-forming vector of a user within a serving cell (hereinafter referred to as a user equipment b) is independently determined without coordination of the cell A. The reception beam-forming vector can be optimized using an MMSE beam-forming matrix. For example, the Hermitian vector of the most dominant left singular vector, from among left singular vectors obtained by performing SVD on the channel $h_{Bb}$ between the base station B $BS_B$ and the user equipment b can be used as the reception beam-forming vector. The Hermitian vector is obtained by performing a transpose operation on the conjugate value of an original vector $$(a_{i,j} = \overline{a_{i,j}}).$$

The Hermitian vector is indicated by attaching a Hermitian operator H to the upper right side of the original vector (for example, $A = A^H$).

Third, the cell B knows a codebook of the cell A.

It is first assumed that the rank of the base station B $BS_B$ is 1. For convenience of description, the two neighbor cells illustrated in FIG. 4 are described as an example. It is assumed that the cell A and the cell B is in a MIMO (Multiple Input Multiple Output) environment, and the number of each of transmission and reception antennas is 4. A transmission rank of the base station A $BS_A$ is $n_A$($1 \le n_A \le N_T$). The user equipment a and the user equipment b interfere with each other and they receive downlink data on the same time and at the same frequency band.

A reception SINR of the user equipment b can be expressed as follows.

MathFigure 13

$$SINR_b = \frac{|v_b h_{Bb} u_b|^2 p_B}{N_b + \sum_{m=1}^{n_A} |v_b h_{Ab} u_{a,im}|^2 p_{A,m}} \quad \text{[Math. 13]}$$

Here, $p_{A,m}$ is the transmission power of $m^{th}$ data transmitted by the base station A $BS_A$ and is $$\sum_{m=1}^{n_A} p_{A,m} \le p_A.$$

$p_A$ is a maximum transmission power of the base station A $BS_A$, and $p_B$ a maximum transmission power of the base station B $BS_B$. $N_b$ is interference and noise experienced by the user equipment b. In this case, interference experienced by the user equipment b from other cells except for the cell A has been excluded. $v_b$ is a reception beam-forming row vector of the user equipment b, $u_b$ is a transmission beam-forming column vector of the base station B $BS_B$, and $u_{a,im}$ is a transmission beam-forming vector for the $m^{th}$ data of the base station A $BS_A$ and is an $(i_m)^{th}$ transmission beam-forming column vector belonging to a codebook. The norm of all the beam-forming vectors is 1. The transmission beam-forming column vector $u_b$ of the base station B $BS_B$ and the reception beam-forming row vector $v_b$ of the user equipment b can be determined as a combination of reception signals with the best quality. For example, the most dominant right singular vector obtained by performing SVD on the channel $h_{Bb}$ between the base station B $BS_B$ and the user equipment b can be used as a transmission beam-forming vector, and the Hermitian vector of the most dominant left singular vector can be used as a reception beam-forming vector.

The user equipment b can find a maximum-aligned beam-forming vector (hereinafter referred to as a neighbor aligned beam-forming vector) from among all beam-forming vectors existing in the codebook of the cell A with respect to the Hermitian vector of the effective channel $v_b h_{Ab}$ between the user equipment b and the base station A $BS_A$ (hereinafter referred to as a neighbor effective channel) using the following equation.

MathFigure 14

$$j_b = \max_i |v_b h_{Ab} u_{a,i}| \quad \text{[Math. 14]}$$

for all i

Here, $j_b$ is an index indicating the neighbor aligned beam-forming vector from a viewpoint of the user equipment b, $v_b h_{Ab}$ is the effective channel between the user equipment b and the base station A $BS_A$, and $u_{a,i}$ is one of the vectors existing in the codebook of the cell A.

In a similar way, the user equipment b can find a maximum-aligned beam-forming vector (hereinafter referred to as a self-aligned beam-forming vector) from among all the beam-forming vectors existing in the union of the codebook of the cell B, the codebook of the cell A, and the codebook of the cell B with respect to the Hermitian vector of an effective channel (hereinafter referred to as a self-effective channel) $v_b h_{Bb}$ between the user equipment b and the cell B. From a viewpoint of the user equipment b, $k_b$ is an index indicating the self-aligned beam-forming vector. The index $k_b$ can be found with reference to Equation 14.

In the state in which there is no interference resulting from the cell A, the reception SINR of the user equipment b can be expressed as follows.

MathFigure 15

$$SINR_{b(Best)} = \frac{|v_b h_{Bb} u_b|^2 p_B}{N_b} \quad \text{[Math. 15]}$$

Here, $v_b h_{Bb}$ is an effective channel between the user equipment b and the base station B $BS_B$, $u_b$ is a transmission beam-forming vector of the base station B $BS_B$, $p_B$ is a maximum transmission power of the base station B, and $N_b$ is interference and noise experienced by the user equipment b. Assuming that the nulling vector of the effective channel $v_b h_{Ab}$ is the transmission beam-forming vector $u_{a,im}$ of the base station A $BS_A$, a best reception SINR with no interference from the cell A can be found.

Figure 5:
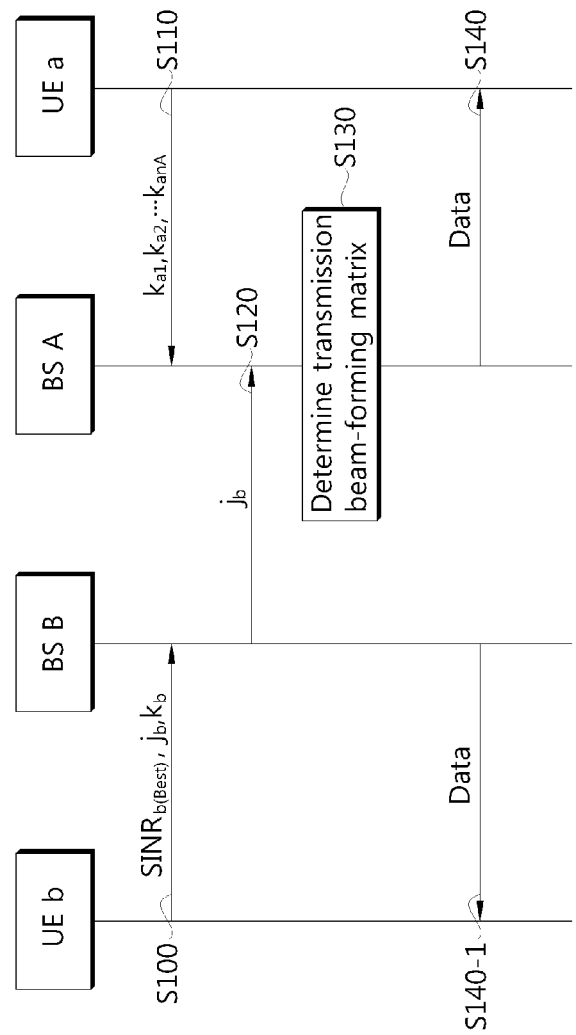
FIG. 5 is a flowchart illustrating a method of transmitting data according to an embodiment of the present invention.

FIG. 5 is a flowchart illustrating a method of transmitting data according to an embodiment of the present invention.

Referring to FIG. 5, the user equipment b (UE b) transmits a reception SINR $SINR_{b(Best)}$ of the user equipment b with no interference from the cell A, an index $j_b$ indicative of a neighbor aligned beam-forming vector, and an index $k_b$ indicative of a self-aligned beam-forming vector to the base station B (BS B) at step S100. The reception SINR $SINR_{b(Best)}$, the index $j_b$, and the index $k_b$ can be feedback information which is generated by the user equipment b based on signals received from the base station A or the base station B or both.

The user equipment a (UE a) transmits indices $k_{a1}$, $k_{a2}$, ..., $k_{anA}$, indicating self-aligned beam-forming vectors, to the base station A at step S110. The indices $k_{a1}, k_{a2}, \ldots, k_{anA}$ can be feedback information which is generated by the user equipment a based on signals received from the base station A (BS A). The self-aligned beam-forming vectors transmitted by the user equipment a are maximum-aligned beam-forming vectors with respect to the Hermitian vector of the effective channel $v_a h_{Aa}$ between the user equipment a and the cell A, from among all the beam-forming vectors existing in the codebook of the cell A. Since the transmission rank of the cell A is $n_A$, the effective channel between the user equipment a and the cell A can be indicated by $v_{a,1} h_{Aa}$, $v_{a,2} h_{Aa}, \ldots, v_{a,nA} h_{Aa}$. $v_{a,i}$ can be determined by the Hermitian vector of an $i^{th}$ proper left singular vector. In this case, the self-aligned beam-forming vectors for the respective effective channels between the user equipment a and the base station A can be indicated by $u_{a,ka1}, u_{a,ka2}, \ldots, u_{a,kanA}$, and indices of the self-aligned beam-forming vectors can be indicated by the indices $k_{a1}, k_{a2}, \ldots, k_{anA}$.

The base station B transmits the index $j_b$, received from the user equipment b, to the base station A at step S120. The index $j_b$ can be transmitted to the base station A through a backhaul link. Alternatively, the index $j_b$ may be directly transmitted from the user equipment b to the base station A through a radio channel.

The base station A which has received the indices $k_{a1}, k_{a2}, \ldots, k_{anA}$ from the user equipment a at step S110 and the index $j_b$ from the base station B at step S120 determines a transmission beam-forming matrix at step S130. To determine the transmission beam-forming matrix, the base station A finds a matrix U as follows.

MathFigure 16

$$U = X(X^H X + \alpha I)^{-1} \qquad [\text{Math.16}]$$

Here, $$X = [u_{a,k_{a1}} \quad u_{a,k_{a2}} \quad \cdots \quad u_{a,k_{anA}} \quad u_{a,j_b}],$$

and $\alpha$ is a factor to control whether the matrix U approaches an MMSE beam-forming matrix or a ZF beam-forming matrix. If the factor $\alpha$ is 0, it leads to a pseudo inverse matrix, and so the matrix U is operated as a pure ZF beam-forming matrix. In the process of generating the matrix U, the neighbor aligned beam-forming vector $u_{a,jb}$ is included in X. Accordingly, the matrix U includes not only a transmission beam-forming vector for the user equipment a, but a transmission beam-forming vector for the user equipment b. To produce a final transmission beam-forming matrix U' from which the transmission beam-forming vector for the user equipment b has been removed, a new matrix including only the 1 to $(n_A)^{th}$ column vectors of the matrix U is generated, and the norm of each the 1 to $(n_A)^{th}$ column vectors is normalized to 1. For example, when $\alpha=0$, the final transmission beam-forming matrix U' consists of only column vectors corresponding to the null space of $u_{a,jb}^H$, from among the column vectors constituting the matrix U. In the case in which the base station A has a quantized codebook, the final transmission beam-forming matrix U' may be determined using beam-forming that is best aligned with each of the column vectors of the final transmission beam-forming matrix U' within the codebook. The transmission beam-forming matrix can be said to be a precoding matrix.

The base station A transmits data to the user equipment a using the determined transmission beam-forming matrix at step S140, and the base station B transmits data to the user equipment b at step S140-1. Assuming that multiple data streams transmitted from the base station A to user equipments belonging to the cell A are a column vector d, the column vector d can be a vector s=U'd after being inputted to the transmission antenna and then precoded. In Equation 16, when $\alpha=0$, the base station A minimizes interference for the user equipment b. Accordingly, the base station B can transmit the data to the user equipment b at a transmission rate based on the reception SINR $SINR_{b(Best)}$.

Here, the operation of the cell A determining the transmission beam-forming matrix is similar to a process of implementing a ZF beam-forming matrix in a single cell MU-MIMO environment except that the base station A performs the ZF beam-forming matrix with consideration taken of not only user equipments placed in the cell A, but user equipments placed at the boundary of the cell B. In this case, since data for user equipments placed at the boundary of the cell B are not shared among them, beam-forming vectors for the user equipments placed at the boundary of the cell B in the ZF beam-forming matrix are not used when the data are actually transmitted.

Unlike the above, in the case in which data can be shared between the cell A and the cell B, the embodiment of FIG. 5 can be extended to a joint transmission scheme and then used. That is, after finding the matrix U, the base station A can apply the data $d_B$ of the base station B to the last column vector of the matrix U and apply the data $d_i$ of the base station A to each of the remaining column vectors. The norm of each of the column vectors of the matrix U is normalized to 1. A vector inputted to the transmission antenna of the base station A is s=Ud', and $d'=tr([d_1, d_2, \ldots, d_i, \ldots, d_{NA}, d_B])$. Therefore, the user equipment b can obtain a macro diversity gain by combining a signal, received from the base station A, and a signal received from the base station B. In this case, the user equipment b can obtain an optimized reception beam-forming vector $v_b$ by performing SVD on a composite channel $[h_{Bb} h_{Ab}]$ of the channel $h_{Bb}$ between the user equipment b and the base station B and the channel $h_{Ab}$ between the user equipment b and the base station A. The user equipment b can feed back the effective channels $v_b h_{Bb}$ and $v_b h_{Ab}$ to the base station B and the base station A, respectively, and the base stations A and B can jointly transmit data using the feedback information.

Figure 6:
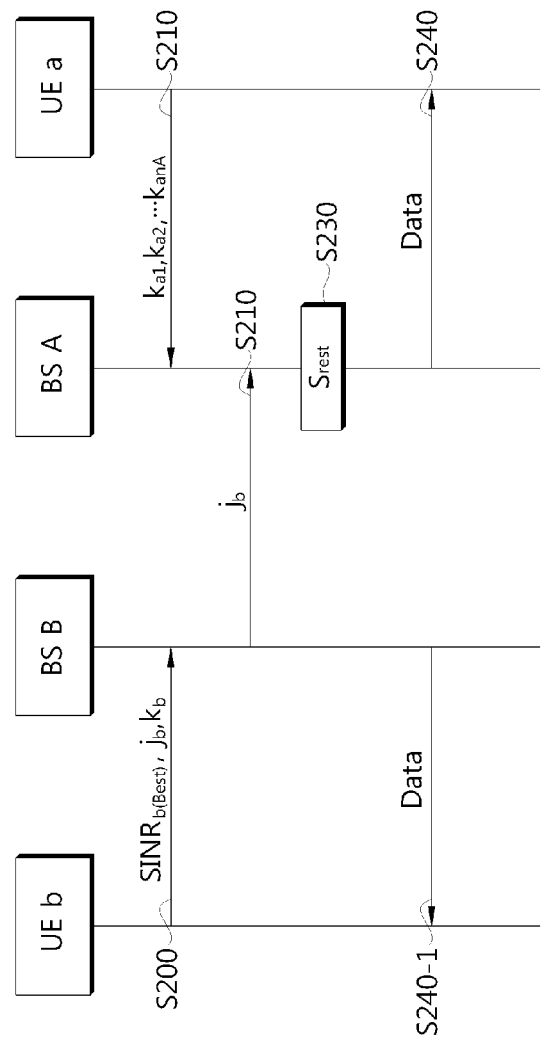
FIG. 6 is a flowchart illustrating a method of transmitting data according to another embodiment of the present invention.

*FIG. 6 is a flowchart illustrating a method of transmitting data according to another embodiment of the present invention.

Referring to FIG. 6, the user equipment b (UE b) transmits a reception SINR $SINR_{b(Best)}$ of the user equipment b with no interference from the cell A, an index $j_b$ indicative of a neighbor aligned beam-forming vector, and an index $k_b$ indicative of a self-aligned beam-forming vector to the base station B (BS B) at step S200. The reception SINR $SINR_{b(Best)}$, the index $j_b$, and the index $k_b$ can be feedback information which is generated by the user equipment b based on signals received from the base station A or the base station B or both.

The user equipment a (UE a) transmits indices $k_{a1}, k_{a2}, \ldots, k_{anA}$, indicating the self-aligned beam-forming vectors, to the base station A at step S210. The indices $k_{a1}, k_{a2}, \ldots, k_{anA}$ can be feedback information which is generated by the user equipment a based on signals received from the base station A (BS A). The self-aligned beam-forming vectors transmitted by the user equipment a are maximum-aligned beam-forming vectors with respect to the Hermitian vector of the effective channel $v_a h_{Aa}$ between the user equipment a and the cell A, from among all the beam-forming vectors existing in the codebook of the cell A. Since the transmission rank of the cell A is $n_A$, the effective channel between the user equipment a and the cell A can be indicated by $v_{a,1} h_{Aa}$, $v_{a,2}h_{Aa}, \ldots, v_{a,nA}h_{Aa}$. $v_{a,i}$ can be determined by the Hermitian vector of an $i^{th}$ proper left singular vector. In this case, the self-aligned beam-forming vectors for the respective effective channels between the user equipment a and the base station A can be indicated by $u_{a,ka1}, u_{a,ka2}, \ldots, u_{a,kanA}$, and indices of the self-aligned beam-forming vectors can be indicated by the indices $k_{a1}, k_{a2}, \ldots, k_{anA}$.

The base station B transmits the index $j_b$, received from the user equipment b, to the base station A at step S220. The index $j_b$ can be transmitted to the base station A through a backhaul link. Alternatively, the index $j_b$ may be directly transmitted from the user equipment b to the base station A through a radio channel.

The base station A which has received the indices $k_{a1}, k_{a2}, \ldots, k_{anA}$ from the user equipment a at step S210 and the index $j_b$ from the base station B at step S220 determines a transmission beam-forming matrix at step S230. The transmission beam-forming matrix can be said to be a precoding matrix. To determine the transmission beam-forming matrix, the base station A sets a restricted beam-forming vector set $S_{rest}$ as follows.

MathFigure 17

$$S_{rest} = \{U_{a,i} | U_{a,i}{}^H u_{a,jb} = 0\} \text{ for all } i \qquad [\text{Math.17}]$$

The restricted beam-forming vector set $S_{rest}$ is the set of beam-forming vectors which are orthogonal to the neighbor aligned beam-forming vector $u_{aj,b}$ from a viewpoint of the user equipment b, from all beam-forming vectors existing in the codebook of the cell A. The base station A determines the transmission beam-forming matrix, consisting of only the elements of the restricted beam-forming vector set $S_{rest}$, by taking the indices $k_{a1}, k_{a2}, \ldots, k_{anA}$ into consideration.

The base station A transmits data to the user equipment a using the determined transmission beam-forming matrix at step S240, and the base station B transmits data to the user equipment b at step S240-1.

If the neighbor aligned beam-forming vector $u_{a,jb}$ of the user equipment b is perfectly aligned with the effective channel $v_b h_{Ab}$ between the base station A and the user equipment b (that is, $u_{a,jb} = (v_b h_{Ab})^H / \|v_b h_{Ab}\|$), the restricted beam-forming vector set $S_{rest}$ includes vectors which belong to the null space of the effective channel $v_b h_{Ab}$ between the base station A and the user equipment b. Accordingly, if the transmission beam-forming matrix is determined using the matrices consisting of the vectors within the restricted beam-forming vector set $S_{rest}$ or the column vectors of the restricted beam-forming vector set $S_{rest}$, there is no interference of the base station A affecting the user equipment b. Accordingly, the base station B can transmit the data to the user equipment b at a transmission rate based on the reception SINR $SINR_{b(Best)}$.

However, in the case in which the base station A uses a quantized codebook, the neighbor aligned beam-forming vector $u_{a,jb}$ is not perfectly aligned with the Hermitian vector of the effective channel $v_b h_{Ab}$ between the user equipment b and the cell A. Accordingly, although the base station A uses a vector or a matrix, belonging to the restricted beam-forming vector set $S_{rest}$, as the transmission beam-forming matrix, the base station A can give some interference to user equipments placed at the boundary of the cell B. The degree of interference of the base station A affecting user equipments placed at the boundary of the cell B is increased as the neighbor aligned beam-forming vector $u_{a,jb}$ is deviated from the Hermitian vector of the effective channel $v_b h_{Ab}$ between the user equipment b and the cell A. Accordingly, the base station B may transmit the data to the user equipment b at a transmission rate based on $\beta SINR_{b(Best)}$ by taking the increase in the degree of interference into consideration. Here, $\beta$ is determined as a function having a difference between $u_{a,j}$ and $(v_b h_{Aa})^H$ as a factor.

The method illustrated in FIG. 5 is identical to the method illustrated in FIG. 6 in that interference is not caused in the user equipment b. However, orthogonality must be maintained between multiple data transmitted by the base station A in FIG. 5, whereas there is no orthogonality between multiple data in FIG. 6.

Unlike the method illustrated in FIG. 6, the base station A may set the restricted beam-forming vector set as follows.

MathFigure 18

$$S_{rest}' = \{U_{a,i} \| U_{a,i}{}^H U_{a,jb}| < \rho\} \text{ for all } i (0 < \rho < 1) \qquad [\text{Math.18}]$$

The restricted beam-forming vector set $S_{rest}'$ includes vectors which do not belong to the null space of the effective channel $v_b h_{Ab}$ between the base station A and the user equipment b. Accordingly, if the base station A determines a vector or a matrix, belonging to the restricted beam-forming vector set $S_{rest}'$, as the transmission beam-forming matrix, $SINR_b$ experienced by the user equipment b in each beam-forming matrix is varied. Accordingly, there is a problem in that the base station B has to receive, from the user equipment b, an SINR which is experienced by the user equipment b with respect to all vectors or all matrices belonging to the restricted beam-forming vector set $S_{rest}'$. A method of solving the above problem is described below.

Figure 7:
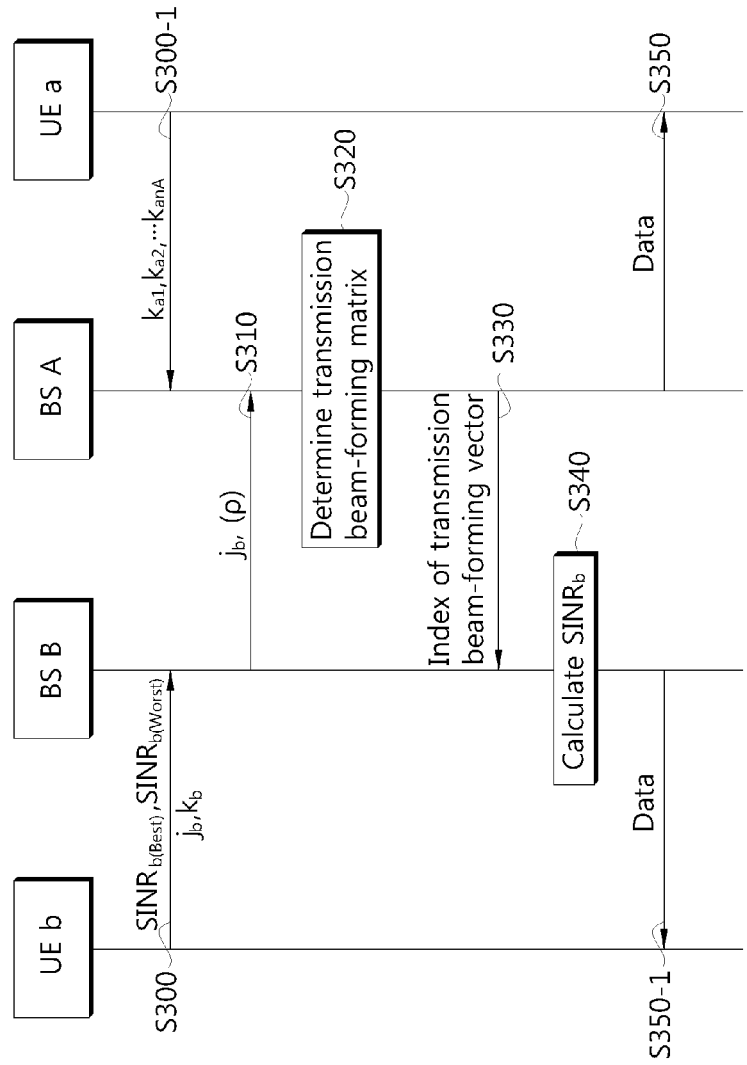
FIG. 7 is a flowchart illustrating a method of transmitting data according to another embodiment of the present invention.

FIG. 7 is a flowchart illustrating a method of transmitting data according to another embodiment of the present invention.

Referring to FIG. 7, the user equipment b transmits an $SINR_{b(Best)}$ that is the reception SINR the user equipment b (UE b) with no interference from the cell A, an index $j_b$ indicative of a neighbor aligned beam-forming vector, an index $k_b$ indicative of a self-aligned beam-forming vector, and an $SINR_{b(Worst)}$ (that is, the worst reception SINR experienced by the user equipment b when the base station (BS A) transmits downlink data using a neighbor aligned beam-forming vector $u_{a,jb}$) to the base station B (BS B) at step S300. The $SINR_{b(Best)}$, the index $j_b$, and the index $k_b$ can be pieces of feedback information which are generated by the user equipment b based on signals received from the base station A or the base station B or both. The user equipment a (UE a) transmits indices $k_{a1}, k_{a2}, \ldots, k_{anA}$, indicating self-aligned beam-forming vectors, to the base station A at step S300-1. The indices $k_{a1}, k_{a2}, \ldots, k_{anA}$ can be feedback information which is generated by the user equipment a based on signal received from the base station A.

The base station B transmits the index $j_b$, received from the user equipment b, to the base station A at step S310. The index $j_b$ can be transmitted to the base station A through a backhaul link. Alternatively, the index $j_b$ may be directly transmitted from the user equipment b to the base station A through a radio channel.

The base station A that has received the index $j_b$ from the user equipment b at step S310 determines a transmission beam-forming matrix at step S320. The transmission beam-forming matrix can be said to be a precoding matrix. To determine the transmission beam-forming matrix, the base station A sets a restricted beam-forming vector set $S_{rest}'$ as in Equation 18. In Equation 18, $\rho$ can be transmitted from the base station B to the base station A at step 310. The base station A determines the transmission beam-forming matrix, including only the elements of the restricted beam-forming vector set $S_{rest}$, by taking the indices $k_{a1}, k_{a2}, \ldots, k_{anA}$ into consideration.

The base station A transmits an index, indicating a transmission beam-forming vector for transmitting downlink data, to the base station B at step S330. The base station B calculates a $SINR_b$ which will be experienced by the user equipment b based on the received index at step S340. A method of the base station B calculating the $SINR_b$ is described below. First, the worst reception SINR $SINR_{b(Worst)}$ which is feedback from the user equipment b to the base station B at step S300 can be expressed as follows.

MathFigure 19

$$SINR_{b(Worst)} = \frac{|v_b h_{Bb} u_b|^2 p_B}{N_b + |v_b h_{Ab} u_{a,jb}|^2 \sum_{m=1}^{n_A} p_{A,m}} \qquad [\text{Math. 19}]$$

$$= \frac{|v_b h_{Bb} u_b|^2 p_B}{N_b + |v_b h_{Ab} u_{a,jb}|^2 p_A}$$

Here, the base station A transmits multiple data streams. It is assumed that the power ratios assigned to respective data by the base station A are identical to each other. In the case in which the base station A uses a specific transmission beam-forming vector $u_{a,im}$, interference which will be experienced by the user equipment b when $$u_{a,jb} = (v_b h_{Ab})^H / \|v_b h_{Ab}\|$$

can be found using the correlation value of $u_{a,im}$ and $u_{a,jb}$.

MathFigure 20

$$\sum_{m=1}^{n} |v_b h_{Ab} u_{a,i_m}|^2 p_A / n = \sum_{m=1}^{n} |u_{a,jb}^H u_{a,i_m}|^2 |v_b h_{Ab} u_{a,jb}|^2 \qquad [\text{Math. 20}]$$

$$p_A / n$$

$$= (|v_b h_{Ab} u_{a,jb}|^2 p_A / n)$$

$$\sum_{m=1}^{n} |u_{a,jb}^H u_{a,i_m}|^2$$

The worst reception SINR $SINR_{b(Worst)}$ may be substituted as follows.

MathFigure 21

$$SINR_{b(Worst)} = \frac{|v_b h_{Bb} u_b|^2 p_B}{N_b + |v_b h_{Ab} \tilde{u}_a|^2 \sum_{m=1}^{n_A} p_{A,m}} \qquad [\text{Math. 21}]$$

$$= \frac{|v_b h_{Bb} u_b|^2 p_B}{N_b + |v_b h_{Ab} \tilde{u}_a|^2 p_A}$$

Here, assuming that $$\tilde{u}_a = (v_b h_{Ab})^H / \|v_b h_{Ab}\|$$

and the base station A uses a specific transmission beam-forming vector $u_{a,im}$, interference to be experienced by the user equipment b can be approximated using the correlation value of $u_{a,im}$ and $u_{a,jb}$ as follows. In this case, approximation error does not exist when $$u_{a,jb} = (v_b h_{Ab})^H / \|v_b h_{Ab}\|$$

MathFigure 22

$$\sum_{m=1}^{n_A} |v_b h_{Ab} u_{a,i_m}|^2 p_A / n_A = \sum_{m=1}^{n_A} |\tilde{u}_a^H u_{a,i_m}|^2 \qquad [\text{Math. 22}]$$

$$|v_b h_{Ab} \tilde{u}_a|^2 p_A / n_A$$

$$= |v_b h_{Ab} \tilde{u}_a|^2$$

$$p_A / n_A \sum_{m=1}^{n_A} |\tilde{u}_a^H u_{a,i_m}|^2$$

$$\approx |v_b h_{Ab} \tilde{u}_a|^2$$

$$p_A / n_A \sum_{m=1}^{n_A} |u_{a,jb}^H u_{a,i_m}|^2$$

Accordingly, assuming that the base station B knows the $SINR_{b(Best)}$, the $SINR_{b(Worst)}$, and the $$|u_{a,jb}^H u_{a,i_m}|^2,$$

in the case in which the base station A transmits downlink data using the specific transmission beam-forming vector $u_{a,im}$, $SINR_b$ to be experienced by the user equipment b can be found. Here, if a beam-forming vector set that can be used in the base station has been restricted, $$|u_{a,jb}^H u_{a,i_m}|^2$$

can be previously calculated for convenience' sake.

Thus, although the base station A uses a beam-forming vector not belonging to the null space, from among beam-forming vectors belonging to the restricted beam-forming vector set $S_{rest}$, as a transmission beam-forming vector, the base station B can know $SINR_b$ which will be experienced by the user equipment b without additional feedback from the user equipment b.

The base station A transmits downlink data to the user equipment a using the determined transmission beam-forming matrix at step S350, and the base station B transmits downlink data to the user equipment b at step S350-1. The base station B can transmit the downlink data to the user equipment b at a transmission rate based on the $SINR_b$ calculated at step S340.

Figure 8:
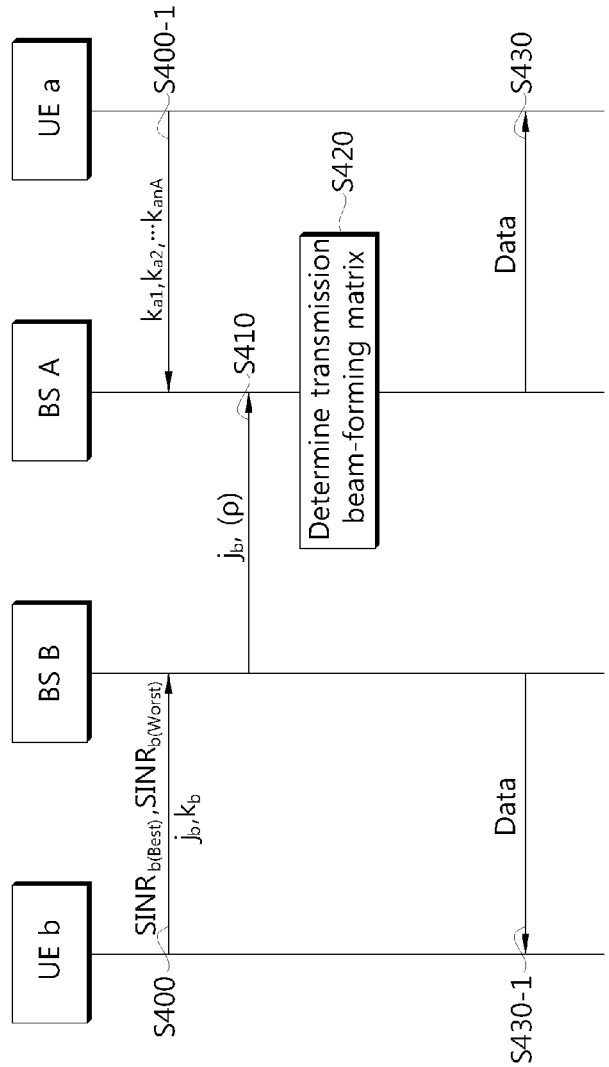
FIG. 8 is a flowchart illustrating a method of transmitting data according to another embodiment of the present invention.

FIG. 8 is a flowchart illustrating a method of transmitting data according to another embodiment of the present invention.

Referring to FIG. 8, the user equipment b transmits an $SINR_{b(Best)}$ that is the reception SINR the user equipment b (UE b) with no interference from the cell A, an index $j_b$ indicative of a neighbor aligned beam-forming vector, an index $k_b$ indicative of a self-aligned beam-forming vector, and an $SINR_{b(Worst)}$ (that is, the worst reception SINR experienced by the user equipment b when the base station (BS A) transmits downlink data using a neighbor aligned beam-forming vector $u_{a,jb}$) to the base station B (BS B) at step S300. The $SINR_{b(Best)}$, the index $j_b$, and the index $k_b$ can be pieces of feedback information which are generated by the user equipment b based on signals received from the base station A (BS A) or the base station B or both. The user equipment a (UE a) transmits indices $k_{a1}, k_{a2}, \ldots, k_{anA}$, indicating self-aligned beam-forming vectors, to the base station A at step S400-1. The indices $k_{a1}, k_{a2}, \ldots, k_{anA}$ can be feedback information which is generated by the user equipment a based on signal received from the base station A.

The base station B transmits the index $j_b$, received from the user equipment b, to the base station A at step S410. The index $j_b$ can be transmitted to the base station A through a backhaul link. Alternatively, the index $j_b$ may be directly transmitted from the user equipment b to the base station A through a radio channel.

The base station A that has received the index $j_b$ from the user equipment b at step S410 determines a transmission beam-forming matrix at step S420. The transmission beam-forming matrix can be said to be a precoding matrix. To determine the transmission beam-forming matrix, the base station A sets a restricted beam-forming vector set $S_{rest}$, as in Equation 18. In Equation 18, ρ can be transmitted from the base station B to the base station A at step 410. The base station A determines the transmission beam-forming matrix, including only the elements of the restricted beam-forming vector set $S_{rest}$, by taking the indices $k_{a1}, k_{a2}, \ldots, k_{anA}$ into consideration.

The base station A transmits downlink data to the user equipment a using the determined transmission beam-forming matrix at step S430, and the base station B transmits downlink data to the user equipment b at step S430-1. The base station B can transmit the downlink data to the user equipment b at a transmission rate based on the $SINR_{b(Worst)}$ received from the user equipment b at step S400. In the method illustrated in FIG. 8 unlike in the method illustrated in FIG. 7, the base station A transmits the transmission beam-forming matrix to the base station B, and the base station B transmits the downlink data to the user equipment b at a transmission rate based on the $SINR_{b(Worst)}$ without calculating $SINR_b$. Accordingly, the overhead of a base station can be reduced, and the feedback overhead of a user equipment can be reduced because the user equipment b does not transmit the $SINR_{b(Best)}$ at step S400.

The example in which the rank of the base station of a serving cell is 1 has been described above. However, the above example can be extended to a case in which the transmission rank of not only a neighbor cell, but a serving cell is plural.

Figure 9:
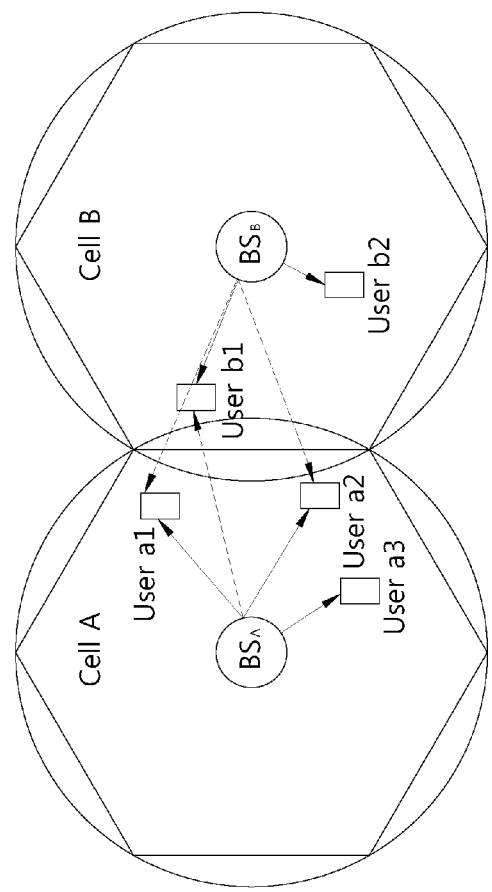
FIG. 9 is a diagram illustrating two neighbor cells.

FIG. 9 is a diagram illustrating two neighbor cells. Although an example in which the two cells coordinate with each other has been illustrated for convenience of description, the present invention is not limited to the above example. For example, the present invention can be applied to an example in which three or more cells coordinate with each other. Alternatively, the present invention can be applied to not only a SU-MIMO method, but an MU-MIMO method. It is assumed that the number of transmission/reception antennas of each of a cell A and a cell B is 4. It is assumed that the transmission rank of the cell A is $n_A$=3, and the cell A transmits data to three users (a user equipment a1, a user equipment a2, and a user equipment a3). It is also assumed that the transmission rank of the cell b is $n_B$=2, and the cell B transmits data to two users (a user equipment b1 and a user equipment b2).

Referring to FIG. 9, a user equipment a1 (User a1) and a user equipment a2 (User a2) are placed at the boundary of the cell A, and a user equipment a3 (User a3) is placed at the center of the cell A. A user equipment b1 (User b1) is placed at the boundary of the cell B, and a user equipment b2 (User b2) is placed at the center of the cell B. A base station A ($BS_A$) is the base station of the cell A, and a base station B ($BS_B$) is the base station of the cell B. From a viewpoint of the user equipment a1, the user equipment a2, and the user equipment a3, the cell A is a serving cell and the cell B is a neighbor cell.

From a viewpoint of the user equipment b1 and the user equipment b2, the cell B is a serving cell and the cell A is a neighbor cell. The user equipment a1 and the user equipment a2 can experience strong interference resulting from the cell B because they are placed at the boundary of the cell A. The user equipment b1 can experience strong interference resulting from the cell A because it is placed at the boundary of the cell B.

A channel providing strong interference is indicated by a dotted line in FIG. 9, and one of the objects of the present invention is to remove or weaken such interference through coordination between the cells. The user equipment a3 can experience relatively weak interference resulting from the cell B because it is placed at the center of the cell A. The user equipment b2 can experience relatively weak interference resulting from the cell A because it is placed at the center of the cell B. The user equipment a1, the user equipment a2, the user equipment a3, the user equipment b1, and the user equipment b2 interfere with each with and receive downlink data on the same time and at the same frequency band. The cell A and the cell B can share scheduling information about the time and the frequency resources. It is assumed that the cell A is a coordination cell which makes an effort to reduce downlink interference affecting the user equipment b1. It is also assumed that the cell B is a coordination cell which makes an effort to reduce downlink interference affecting the user equipment a1 and the user equipment a2. The cell A can request beam avoidance from the cell B, and the cell B can perform beam-forming at the beam avoidance request of the cell A. The cell B can request beam avoidance from the cell A, and the cell A can perform beam-forming at the beam avoidance request of the cell B.

A channel between the base station A and the user equipment a1, a channel between the base station A and the user equipment a2, and a channel between the base station A and the user equipment a3 are respectively indicated by $h_{Aa1}$, $h_{Aa2}$, and $h_{Aa3}$. A channel between the base station A and the user equipment b1 and a channel between the base station A and the user equipment b2 are respectively indicated by $h_{Ab1}$ and $h_{Ab2}$. A channel between the base station B and the user equipment a1, a channel between the base station B and the user equipment a2, and a channel between the base station B and the user equipment a3 are respectively indicated by $h_{Ba1}$, $h_{Ba2}$, and $h_{Ba3}$. A channel between the base station B and the user equipment b1 and a channel between the base station B and the user equipment b2 are respectively indicated by $h_{Bb1}$ and $h_{Bb2}$. Hereinafter, $v_{a1}, v_{a2}, v_{a3}, v_{b1}$, and $v_{b2}$ are the reception beam-forming row vectors of the user equipment a1, the user equipment a2, the user equipment a3, the user equipment b1, and the user equipment b2, respectively. The reception beam-forming row vectors $v_{a1}, v_{a2}, v_{a3}, v_{b1}$, and $v_{b2}$ are reception beam-forming row vectors which are optimally selected in relation to a channel from a serving cell to which a corresponding user equipment belongs irrespective of the interference of a neighbor cell. For example, the reception beam-forming row vectors $v_{a1}, v_{a2}, v_{a3}, v_{b1}$, and $v_{b2}$ can be the Hermitian vectors of the most dominant left singular vectors which are obtained by performing SVD on the channels $h_{Aa1}, h_{Aa2}, h_{Aa3}, h_{Bb1}$, and $h_{Bb2}$, respectively.

SINRs which will be experienced by the user equipment an of the cell A can be expressed as follows. Equation 23 indicates an $SINR_{an(Best)}$ (that is, the reception SINR of the user equipment an with no interference from the cell B). Equation 24 indicates an $SINR_{an(Worst)}$ (that is, the worst reception SINR to be experienced by the user equipment an when the base station B transmits downlink data using the neighbor aligned beam-forming vector $u_{b,ja}$). Equation 25 indicates $SINR_{an}$ (that is, the reception SINR to be experienced by the user equipment an).

MathFigure 23

$$SINR_{a_n(Best)} = \frac{|v_{a_n} h_{Aa_n} u_{a,i_n}|^2 p_{A,n}}{N_{a_n} + \sum_{l=1,(l \neq n)}^{n_A} |v_{a_n} h_{Aa_n} u_{a,i_l}|^2 p_{A,l}}$$ [Math. 23]

MathFigure 24

$$SINR_{a_n(Worst)} = \frac{|v_{a_n} h_{Aa_n} u_{a,i_n}|^2 p_{A,n}}{N_{a_n} + |v_{a_n} h_{Ba_n} u_{b,j_a}|^2 p_B + \sum_{l=1,(l \neq n)}^{n_A} |v_{a_n} h_{Aa_n} u_{a,i_l}|^2 p_{A,l}}$$ [Math. 24]

Here, $j_a$ is an index indicative of a neighbor aligned beam-forming vector.

MathFigure 25

$$SINR_{a_n} = \frac{|v_{a_n} h_{Aa_n} u_{a,i_n}|^2 p_{A,n}}{N_{a_n} + \sum_{m=1}^{n_B} |v_{a_n} h_{Ba_n} u_{b,i_m}|^2 p_{B,m} + \sum_{l=1,(l \neq n)}^{n_A} |v_{a_n} h_{Aa_n} u_{a,i_l}|^2 p_{A,l}}$$ [Math. 25]

In Equations 23 to 25, $p_{A,l}$ is $l^{th}$ data transmitted by the base station A, and $p_{B,m}$ is an $m^{th}$ transmission power transmitted by the base station B. $p_{A,n}$ is a maximum transmission power of the base station A, and $p_B$ is a maximum transmission power of the base station B. $N_{an}$ is interference and noise experienced by the user equipment an. $v_{an}$ is a reception beam-forming row vector of the user equipment an, $u_{a,il}$ is a transmission beam-forming column vector for the $l^{th}$ data transmitted by the base station a, $u_{b,im}$ is a transmission beam-forming vector for $m^{th}$ data transmitted by the base station B and is an $(i_m)^{th}$ transmission beam-forming column vector belonging to a codebook. The norm of all the beam-forming vectors is 1. Since the cell A and the cell B transmit multiple data streams, interference between transmission data is taken into consideration in an SINR which will be experienced by the user equipment an. An $SINR_{bn(Best)}$, an $SINR_{bn(Worst)}$, and an $SINR_{bn}$ for the user equipments b1 and b2 of the cell B can be expressed as in Equation 23, Equation 24, and Equation 25.

$p_{A,n}$ is a maximum transmission power of the base station A, and $p_B$ is a maximum transmission power of the base station B. $N_{an}$ is interference and noise experienced by the user equipment an. $v_{an}$ is a reception beam-forming row vector of the user equipment an, $u_{a,il}$ is a transmission beam-forming column vector for the $i^{th}$ data transmitted by the base station a, $u_{b,im}$ is a transmission beam-forming vector for $m^{th}$ data transmitted by the base station B and is an $(i_m)^{th}$ transmission beam-forming column vector belonging to a codebook. The norm of all the beam-forming vectors is 1. Since the cell A and the cell B transmit multiple data streams, interference between transmission data is taken into consideration in an SINR which will be experienced by the user equipment an. An $SINR_{bn(Best)}$, an $SINR_{bn(Worst)}$, and an $SINR_{bn}$ for the user equipments b1 and b2 of the cell B can be expressed as in Equation 23, Equation 24, and Equation 25.

Figure 10:
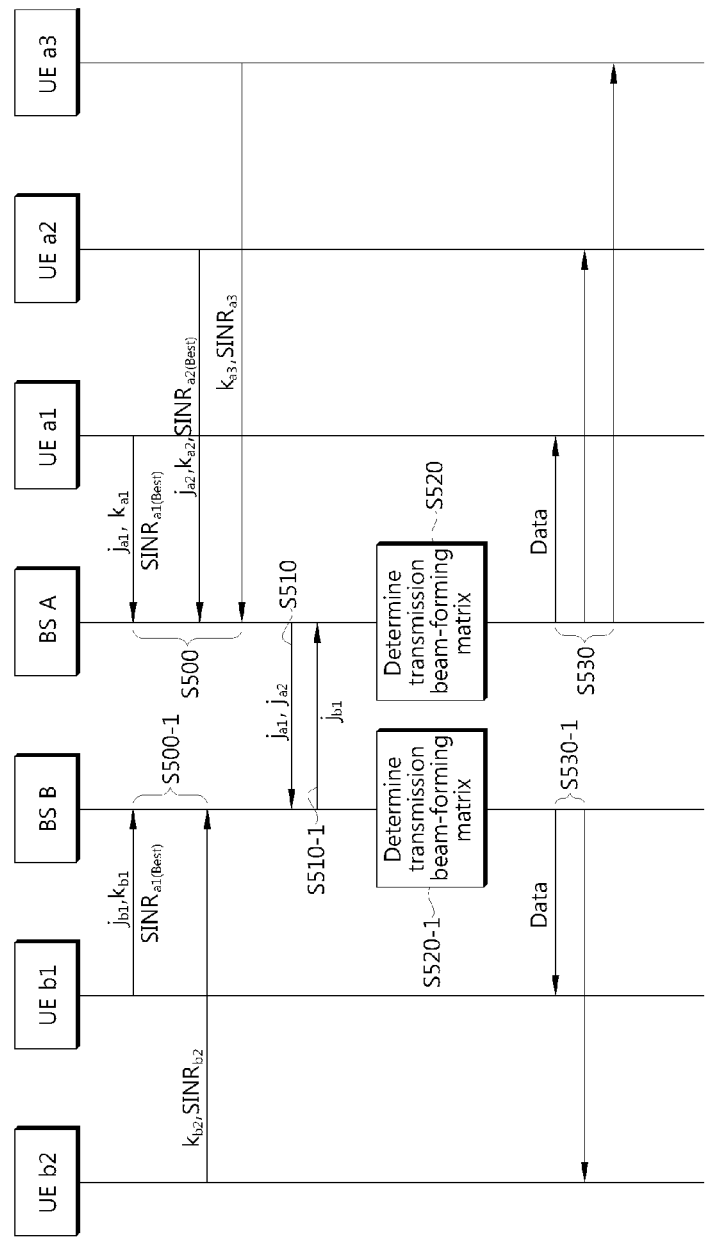
FIG. 10 is a flowchart illustrating a method of transmitting data according to an embodiment of the present invention.

FIG. 10 is a flowchart illustrating a method of transmitting data according to an embodiment of the present invention. From a viewpoint of the user equipment b1 (UE b1), the cell B is a serving cell to request coordination from the cell A, and the cell A is a neighbor cell which coordinates with the cell B in order to reduce interference for the user equipment b1 placed at the boundary of the cell B. From a viewpoint of the user equipment a1 (UE a1) and the user equipment a2 (UE a2), the cell A is a serving cell to request coordination from the cell B, and the cell B is a neighbor cell which coordinates with the cell A in order to reduce interference for the user equipment a1 and the user equipment a2 placed at the boundary of the cell A.

Referring to FIG. 10, each of the user equipment a1, the user equipment a2, and the user equipment a3 transmits channel information and beam-forming vector information to the base station A (BS A) at step S500. Each of the user equipment b1 and the user equipment b2 (UE b2) transmits channel information and beam-forming vector information to the base station B (BS B) at step S500-1. The channel information and the beam-forming vector information can be feedback information which is generated by the user equipment based on signals received from the base station. In more detail, the user equipment a1 transmits an $SINR_{a1(Best)}$ (that is, the reception SINR of the user equipment a1 with no interference from the cell B), an index $j_{a1}$ indicative of a neighbor aligned beam-forming vector, and an index $k_{a1}$ indicative of a self-aligned beam-forming vector to the base station A. The user equipment a2 transmits an $SINR_{a2(Best)}$ (that is, the reception SINR of the user equipment a2 with no interference from the cell B), an index $j_{a2}$ indicative of a neighbor aligned beam-forming vector, and an index $k_{a2}$ indicative of a self-aligned beam-forming vector to the base station A. The user equipment a3 (UE a3) transmits an $SINR_{a3}$ (that is, the reception SINR of the user equipment a3) and an index $k_{a3}$ indicative of a self-aligned beam-forming vector to the base station A. The user equipment b1 transmits an $SINR_{b1(Best)}$ (that is, the reception SINR of the user equipment b1 with no interference from the cell A), an index $j_{b1}$ indicative of a neighbor aligned beam-forming vector, and an index $k_{b1}$ indicative of a self-aligned beam-forming vector to the base station B. The user equipment b2 transmits an $SINR_{b2}$ (that is, the reception SINR of the user equipment b2) and an index $k_{b2}$ indicative of a self-aligned beam-forming vector to the base station B. The indices $j_{a1}$ and $j_{a2}$, transmitted from the user equipment a1 and the user equipment a2, respectively, to the base station A, are indices indicating maximum-aligned beam-forming vectors for the respective Hermitian vectors of the effective channels $v_{a1} h_{Ba1}$ and $v_{a2} h_{Ba2}$ between the user equipment a1 and the base station B and between the user equipment a2 and the base station B, respectively, from among all beam-forming vectors existing in the codebook of the cell B. The index $j_{b1}$ transmitted from the user equipment b1 to the base station B is an index indicating a maximum-aligned beam-forming vector for the Hermitian vector of the effective channel $v_{b1} h_{Ab1}$ between the user equipment b1 and the base station A, from among all beam-forming vectors existing in the codebook of the cell A.

The base station A transmits the indices $j_{a1}$ and $j_{a2}$, received from the user equipment a1 and the user equipment a2, to the base station B at step S510. The base station B transmits the index $j_{b1}$, received from the user equipment b1, to the base station A at step S510-1. The indices $j_{a1}$ and $j_{a2}$ may be directly transmitted from the user equipment a to the base station B through a radio channel. The index $j_{b1}$ may be directly transmitted from the user equipment b to the base station A through a radio channel.

The base station A determines a transmission beam-forming matrix based on the index $j_{b1}$, received from the user equipment b1, and the indices $k_{a1}$, $k_{a2}$, and $k_{a3}$ received from the user equipment a1, the user equipment a2, and the user equipment a3 at step S520. The base station B determines a transmission beam-forming matrix based on the indices $j_{a1}$ and $j_{a2}$, received from the user equipment a1 and the user equipment a2, and the indices $k_{b1}$ and $k_{b2}$ received from the user equipment b1 and the user equipment b2 at step S520-1.

To find the transmission beam-forming matrix, the base station A and the base station B find respective matrices $U_A$ and $U_B$ as in Equation 16. To find the matrix $U_A$, the base station A finds self-aligned beam-forming vectors $u_{a,ka1}$, $u_{a,ka2}$, and $u_{a,ka3}$ for the respective effective channels $v_{a1}h_{Aa1}$, $v_{a2}h_{Aa2}$, and $v_{a3}h_{Aa3}$ between the base station A and the user equipment a1, between the base station A and the user equipment a2, and between the base station A and the user equipment a3 and finds a neighbor aligned beam-forming vector $u_{a,jb1}$ for the effective channel $v_{b1}h_{Abl}$ between the base station A and the user equipment b1, thus producing $X_A=[u_{a,ka1}, u_{a,ka2}, u_{a,ka3}, u_{a,jb1}]$. To find the matrix $U_B$, the base station B finds self-aligned beam-forming vectors $u_{b,kb1}$ and $u_{b,kb2}$ for the respective effective channels $v_{a1}h_{Bb1}$ and $v_{b2}h_{Bb2}$ between the base station B and the user equipment b1 and between the base station B and the user equipment b2 and finds neighbor aligned beam-forming vectors $u_{b,ja1}$ and $U_{b,ja2}$ for the respective effective channels $v_{a1}h_{Ba1}$ and $v_{b2}h_{Bb2}$ between the base station B and the user equipment a1 and between the base station B and the user equipment a2, thus producing $X_B=[u_{b,kb1}, u_{b,kb2}, u_{b,ja1}, u_{b,ja2}]$.

The base station A and the base station B perform an MMSE beam-forming matrix or a ZF beam-forming matrix by controlling the factor α and find the respective matrices $U_A$ and $U_B$. The base station A produces a new matrix including only the first to third column vectors of the matrix $U_A$, normalizes the norm of each of the column vectors to 1, and finds a final transmission beam-forming matrix $U_A'$ from which the beam-forming vectors for the user equipment b1 have been removed from the matrix $U_A$. The base station B produces a new matrix including only the first and second column vectors of the matrix $U_B$, normalizes the norm of each of the column vectors to 1, and finds a final transmission beam-forming matrix $U_B'$ from which the beam-forming vectors for the user equipment a1 and the user equipment a2 have been removed from the matrix $U_B$.

The base station A transmits data to the user equipment a1, the user equipment a2, and the user equipment a3 based on the final transmission beam-forming matrix $U_A$, determined at step S520, at step S530. The base station B transmits data to the user equipment b1 and the user equipment b2 based on the final transmission beam-forming matrix $U_B$, determined at step S520-1, at step S530-1. The base station A sets the transmission rates of streams based on the $SINR_{a1(Best)}$, the $SINR_{a2(Best)}$, and the $SINR_{a3}$ and transmits downlink data to the user equipment a1, the user equipment a2, and the user equipment a3 at the respective set transmission rates. The base station B sets the transmission rates of respective streams based on the $SINR_{b1(Best)}$ and the $SINR_{b2}$ and transmits downlink data to the user equipment b1 and the user equipment b2 at the respective set transmission rates.

Figure 11:
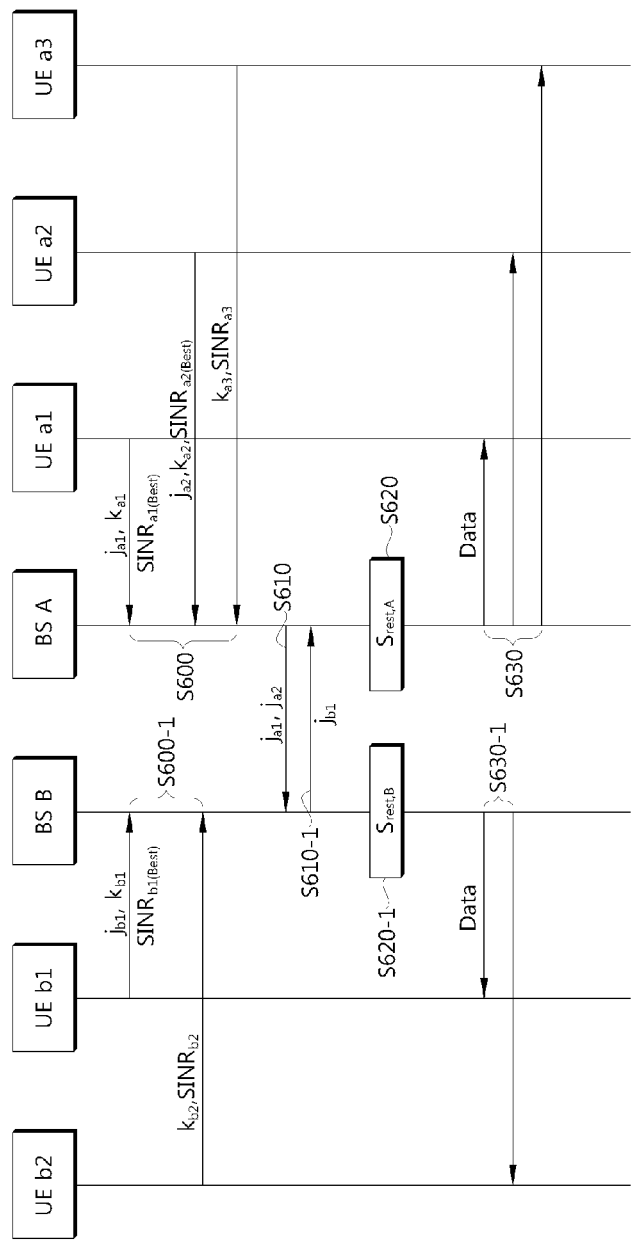
FIG. 11 is a flowchart illustrating a method of transmitting data according to another embodiment of the present invention.

FIG. 11 is a flowchart illustrating a method of transmitting data according to another embodiment of the present invention. From a viewpoint of the user equipment b1, the cell B is a serving cell to request coordination from the cell A, and the cell A is a neighbor cell which coordinates with the cell B in order to reduce interference for the user equipment b1 placed at the boundary of the cell B. From a viewpoint of the user equipment a1 (UE a1) and the user equipment a2 (UE a2), the cell A is a serving cell to request coordination from the cell B, and the cell B is a neighbor cell which coordinates with the cell A in order to reduce interference for the user equipment a1 and the user equipment a2 placed at the boundary of the cell A.

Referring to FIG. 11, each of the user equipment a1, the user equipment a2, and the user equipment a3 (UE a3) transmits channel information and beam-forming vector information to the base station A (BS A) at step S600. Each of the user equipment b1 (UE b1) and the user equipment b2 (UE b2) transmits channel information and beam-forming vector information to the base station B (BS B) at step S600-1. The channel information and the beam-forming vector information can be feedback information which is generated by the user equipment based on signals received from the base station. In more detail, the user equipment a1 transmits an $SINR_{a1(Best)}$ (that is, the reception SINR of the user equipment a1 with no interference from the cell B), an index $j_{a1}$ indicative of a neighbor aligned beam-forming vector, and an index $k_{a1}$ indicative of a self-aligned beam-forming vector to the base station A. The user equipment a2 transmits an $SINR_{a2(Best)}$ (that is, the reception SINR of the user equipment a2 with no interference from the cell B), an index $j_{a2}$ indicative of a neighbor aligned beam-forming vector, and an index $k_{a2}$ indicative of a self-aligned beam-forming vector to the base station A. The user equipment a3 transmits an $SINR_{a3}$ (that is, the reception SINR of the user equipment a3) and an index $k_{a3}$ indicative of a self-aligned beam-forming vector to the base station A. The user equipment b1 transmits an $SINR_{b1(Best)}$ (that is, the reception SINR of the user equipment b1 with no interference from the cell A), an index $j_{b1}$ indicative of a neighbor aligned beam-forming vector, and an index $k_{b1}$ indicative of a self-aligned beam-forming vector to the base station B. The user equipment b2 transmits an $SINR_{b2}$ (that is, the reception SINR of the user equipment b2) and an index $k_{b2}$ indicative of a self-aligned beam-forming vector to the base station B. The indices $j_{a1}$ and $j_{a2}$, transmitted from the user equipment a1 and the user equipment a2, respectively, to the base station A, are indices indicating maximum-aligned beam-forming vectors for the respective Hermitian vectors of the effective channels $v_{a1}h_{Ba1}$ and $v_{a2}h_{Ba2}$ between the user equipment a1 and the base station B and between the user equipment a2 and the base station B, respectively, from among all beam-forming vectors existing in the codebook of the cell B. The index $j_{b1}$ transmitted from the user equipment b1 to the base station B is an index indicating a maximum-aligned beam-forming vector for the Hermitian vector of the effective channel $v_{b1}h_{Ab1}$ between the user equipment b1 and the base station A, from among all beam-forming vectors existing in the codebook of the cell A.

The base station A transmits the indices $j_{a1}$ and $j_{a2}$, received from the user equipment a1 and the user equipment a2, to the base station B at step S610. The base station B transmits the index $j_{b1}$, received from the user equipment b1, to the base station A at step S610-1. The indices $j_{a1}$ and $j_{a2}$ may be directly transmitted from the user equipments a to the base station B through a radio channel. The index $j_{b1}$ may be directly transmitted from the user equipment b to the base station A through a radio channel.

The base station A determines a transmission beam-forming matrix based on the index $j_{b1}$, received from the user equipment b1, and the indices $k_{a1}$, $k_{a2}$, and $k_{a3}$ received from the user equipment a1, the user equipment a2, and the user equipment a3 at step S620. The base station B determines a transmission beam-forming matrix based on the indices $j_{a1}$ and $j_{a2}$, received from the user equipment a1 and the user equipment a2, and the indices $k_{b1}$ and $k_{b2}$ received from the user equipment b1 and the user equipment b2 at step S620-1.

To determined the transmission beam-forming matrix, the base station A sets a restricted beam-forming vector set $S_{rest,A}$, and the base station B sets a restricted beam-forming vector set $S_{rest,B}$. To set the restricted beam-forming vectors $S_{rest,A}$ and $S_{rest,B}$, the base station A and the base station B can refer to Equation 17. The restricted beam-forming vector set $S_{rest,A}$ is the set of beam-forming vectors which are orthogonal to the neighbor aligned beam-forming vector $u_{a,jb1}$ from a viewpoint of the user equipment b, from among all beam-forming vectors existing in the codebook of the cell A. The restricted beam-forming vector set $S_{rest,B}$ can be the union of the set of beam-forming vectors which are orthogonal to the neighbor aligned beam-forming vector $u_{b,ja1}$ and the set of beam-forming vectors which are orthogonal to the neighbor aligned beam-forming vector $u_{b,ja2}$, from all beam-forming vectors existing in the codebook of the cell B. The base station A determines a transmission beam-forming matrix $U_A$ including only the elements of the restricted beam-forming vector set $S_{rest,A}$, and the base station B determines a transmission beam-forming matrix $U_B$ including only the elements of the restricted beam-forming vector set $S_{rest,B}$.

The base station A transmits data to the user equipment a1, the user equipment a2, and the user equipment a3 based on the transmission beam-forming matrix $U_A$, determined at step S620, at step S630. The base station B transmits data to the user equipment b1 and the user equipment b2 based on the transmission beam-forming matrix $U_B$, determined at step S620-1, at step S630-1. The base station A sets the transmission rates of respective streams based on the $SINR_{a1(Best)}$, the $SINR_{a2(Best)}$, and the $SINR_{a3}$ and transmits downlink data to the user equipment a1, the user equipment a2, and the user equipment a3 at the respective set transmission rates. The base station B sets the transmission rates of respective streams based on the $SINR_{b1(Best)}$ and the $SINR_{b2}$ and transmits downlink data to the user equipment b1 and the user equipment b2 at the respective set transmission rates.

In addition, in the case in which the number of indices for neighbor aligned beam-forming vectors transmitted from a serving base station to a neighbor base station is many, the overhead of control signals is increased. When the number of indices n for the neighbor aligned beam-forming vectors is larger than half the number of antennas $N_{Tx}$ of the neighbor base station, the serving base station can transmit, to the neighbor base station, an index for an ($N_{Tx}$−n) number of beam-forming vectors (hereinafter referred to as an index for nulling beam-forming vectors), which spans the null space of a neighbor effective channel instead of an index for an n number of the neighbor aligned beam-forming vectors. For example, assuming that the number of indices for neighbor aligned beam-forming vectors to be transmitted from the base station A to the base station B is 3 and the number of transmission antennas of the base station B is 4, the base station A can transmit, to the base station B, an index for one nulling beam-forming vector instead of the indices for the three neighbor aligned beam-forming vectors. In this case, the base station B can configure a restricted beam-forming vector set based on the index for the one nulling beam-forming vector.

Figure 12:
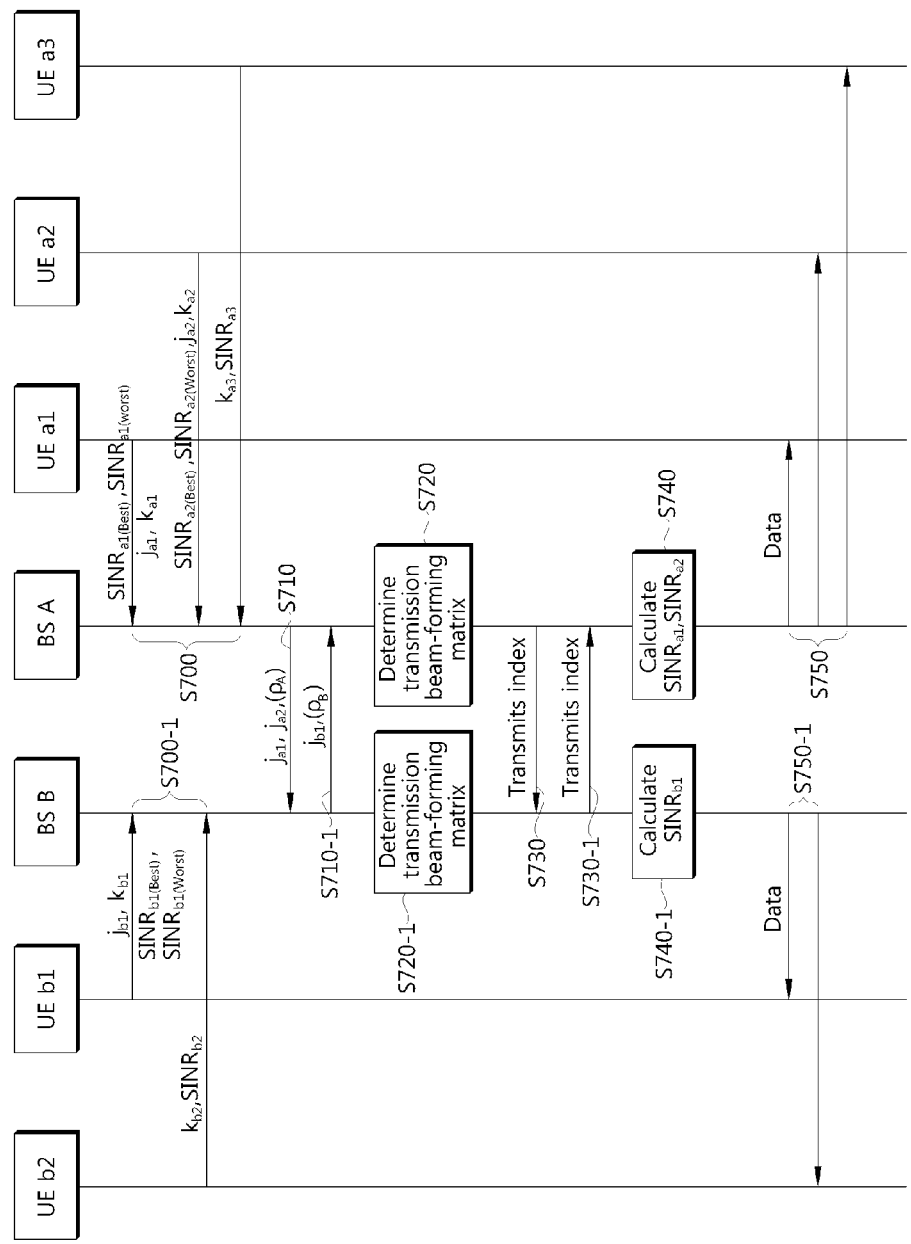
FIG. 12 is a flowchart illustrating a method of transmitting data according to another embodiment of the present invention.

FIG. 12 is a flowchart illustrating a method of transmitting data according to another embodiment of the present invention. From a viewpoint of the user equipment b1, the cell B is a serving cell to request coordination from the cell A, and the cell A is a neighbor cell which coordinates with the cell B in order to reduce interference for the user equipment b1 placed at the boundary of the cell B. From a viewpoint of the user equipment a1 (UE a1) and the user equipment a2 (UE a2), the cell A is a serving cell to request coordination from the cell B, and the cell B is a neighbor cell which coordinates with the cell A in order to reduce interference for the user equipment a1 and the user equipment a2 placed at the boundary of the cell A.

Referring to FIG. 12, each of the user equipment a1, the user equipment a2, and the user equipment a3 (UE a3) transmits channel information and beam-forming vector information to the base station A (BS A) at step S700. Each of the user equipment b1 (UE b1) and the user equipment b2 (UE b2) transmits channel information and beam-forming vector information to the base station B (BS B) at step S700-1. The channel information and the beam-forming vector information can be feedback information generated by the user equipment based on signals received from the base station. In more detail, the user equipment a1 transmits an $SINR_{a1(Best)}$ (that is, the reception SINR of the user equipment a1 with no interference from the cell B), an index $j_{a1}$ indicative of a neighbor aligned beam-forming vector, an index $k_{a1}$ indicative of a self-aligned beam-forming vector, and an $SINR_{a1(Worst)}$ (that is, the worst reception SINR experienced by the user equipment a1 when the base station B transmits downlink data using a neighbor aligned beam-forming vector $u_{b,ja1}$) to the base station A. The user equipment a2 transmits an $SINR_{a2(Best)}$ (that is, the reception SINR of the user equipment a2 with no interference from the cell B), an index $j_{a2}$ indicative of a neighbor aligned beam-forming vector, an index $k_{a2}$ indicative of a self-aligned beam-forming vector, and an $SINR_{a2(Worst)}$ (that is, the worst reception SINR experienced by the user equipment a2 when the base station B transmits downlink data using a neighbor aligned beam-forming vector $u_{b,ja2}$) to the base station A. The user equipment a3 transmits an $SINR_{a3}$ (that is, the reception SINR of the user equipment a3) and an index $k_{a3}$ indicative of a self-aligned beam-forming vector to the base station A. The user equipment b1 transmits an $SINR_{b1(Best)}$ (that is, the reception SINR of the user equipment b1 with no interference from the cell A), an index $j_{b1}$ indicative of a neighbor aligned beam-forming vector, an index $k_{b1}$ indicative of a self-aligned beam-forming vector, and an $SINR_{b1(Worst)}$ (that is, the worst reception SINR experienced by the user equipment b1 when the base station A transmits downlink data using a neighbor aligned beam-forming vector $u_{a,jb1}$) to the base station B. The user equipment b2 transmits an $SINR_{b2}$ (that is, the reception SINR of the user equipment b2) and an index $k_{b2}$ indicative of a self-aligned beam-forming vector to the base station B. The indices $j_{a1}$ and $j_{a2}$ transmitted from the user equipment a1 and the user equipment a2, respectively, to the base station A are indices indicative of respective maximum-aligned beam-forming vectors for the Hermitian vectors of the respective effective channels $v_{a1}h_{Ba1}$ and $v_{a2}h_{Ba2}$ between the user equipment a1 and the base station B and between the user equipment a2 and the base station B, respectively, from among all beam-forming vectors existing in the codebook of the cell B. The index $j_{b1}$ feedback from the user equipment b1 to the base station B is an index indicative of a maximum-aligned beam-forming vector for the Hermitian vector of the effective channel $v_{b1}h_{Ab1}$ between the user equipment b1 and the base station A, from among all beam-forming vectors existing in the codebook of the cell A.

The base station A transmits the indices $j_{a1}$ and $j_{a2}$, received from the user equipment a1 and the user equipment a2, to the base station B at step S710. The base station B transmits the index $j_{b1}$, received from the user equipment b1, to the base station A at step S710-1. The indices $j_{a1}$ and $j_{a2}$ may be directly transmitted from the user equipment a to the base station B through a radio channel. The index $j_{b1}$ may be directly transmitted from the user equipment b1 to the base station A through a radio channel.

The base station A determines a transmission beam-forming matrix based on the index $j_{b1}$, received from the user equipment b1, and the indices $k_{a1}$, $k_{a2}$, and $k_{a3}$ received from the user equipment a1, the user equipment a2, and the user equipment a3 at step S720. The base station B determines a transmission beam-forming matrix based on the indices $j_{a1}$ and $j_{a2}$, received from the user equipment a1 and the user equipment a2, and the indices $k_{b1}$ and $k_{b2}$ received from the user equipment b1 and the user equipment b2 at step S720-1.

To determine the transmission beam-forming matrix, the base station A sets a restricted beam-forming vector set $S_{rest,A'}$, and the base station B sets a restricted beam-forming vector set $S_{rest,B'}$. The base station A and the base station B can refer to Equation 18 in order to set the restricted beam-forming vector set $S_{rest,A'}$ and the restricted beam-forming vector set $S_{rest,B'}$. In Equation 18, ρ can be transmitted by the base station of a neighbor cell at steps S710 and S710-1. The restricted beam-forming vector set $S_{rest,B'}$ can be the intersection of the set of beam-forming vectors which has low correlation with a neighbor aligned beam-forming vector $u_{b,ja1}$ and the set of beam-forming vectors which has low correlation with a neighbor aligned beam-forming vector $u_{b,ja2}$. The base station A determines the transmission beam-forming matrix including only the elements of the restricted beam-forming vector set $S_{rest,A'}$, and the base station B determines the transmission beam-forming matrix including only the elements of the restricted beam-forming vector set $S_{rest,B'}$.

The base station A transmits an index, indicating a transmission beam-forming vector for transmitting downlink data, to the base station B at step S730. The base station B transmits an index, indicating a transmission beam-forming vector for transmitting downlink data, to the base station A at step S730-1. The base station A calculates an $SINR_{a1}$ and an $SINR_{a2}$ which will be respectively experienced by the user equipment a1 and the user equipment a2 based on the index received from the base station B at step S740. The base station B calculates an $SINR_{b1}$ which will be experienced by the user equipment b1 based on the index received from the base station A at step S740-1. The $SINR_{a1}$, $SINR_{a2}$, and $SINR_{b1}$ can be found with reference to Equations 19 and 20.

The base station A transmits data to the user equipment a1, the user equipment a2, and the user equipment a3 based on the transmission beam-forming matrix, determined at step S720, at step S750. The base station B transmits data to the user equipment b1 and the user equipment b2 based on the transmission beam-forming matrix, determined at step S720-1, at step S750-1. The base station A sets the transmission rates of respective streams based on the $SINR_{a1}$, $SINR_{a2}$, and $SINR_{a3}$ and transmits downlink data to the user equipment a1, the user equipment a2, and the user equipment a3 at the respective set transmission rates. The base station B sets the transmission rates of respective streams based on the $SINR_{b1}$ and $SINR_{b2}$ and transmits downlink data to the user equipment b1 and the user equipment b2.

Alternatively, in the case in which the base station A and the base station B do not transmit the indices indicative of the respective transmission beam-forming vectors at steps S730 and S730-1, the SINRs are not set again unlike in steps S740 and S740-1, and data are transmitted on the basis of the $SINR_{(Worst)}$. In other words, the base station A sets the transmission rates of respective streams based on the $SINR_{a1(Worst)}$, the $SINR_{a2(Worst)}$, and the $SINR_{a3}$ and transmits downlink data to the user equipment a1, the user equipment a2, and the user equipment a3 at the respective set transmission rates. The base station B sets the transmission rates of respective streams based on the $SINR_{b1(Worst)}$ and the $SINR_{b2}$ and transmits downlink data to the user equipment b1 and the user equipment b2 at the respective set transmission rates. To reduce feedback overhead in this case UE may not feedback $SINR_{(best)}$.

It has been assumed that the reception rank of each of the user equipments placed at the boundary of the cell is 1. However, the above embodiment can be applied to a case in which the reception rank of each of the user equipments is 2 or more.

Figure 13:
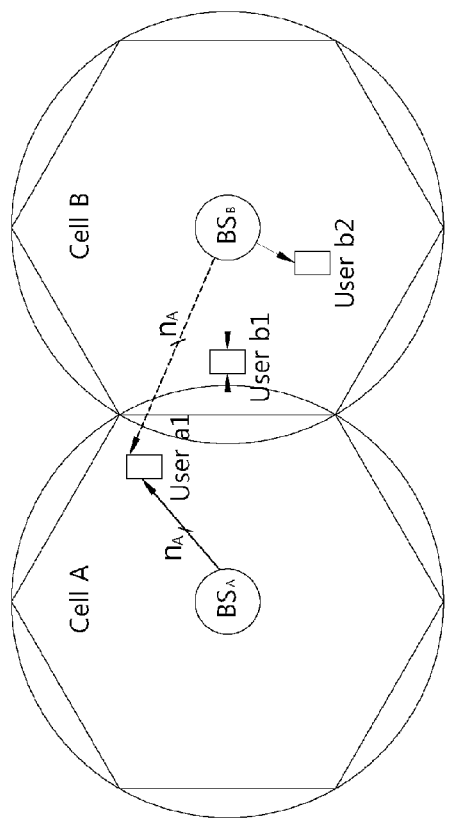
FIG. 13 is a diagram illustrating two neighbor cells when the number of reception ranks of a user equipment placed at the boundary of a cell is plural.

FIG. 13 is a diagram illustrating two neighbor cells when the number of reception ranks of a user equipment placed at the boundary of a cell is plural. Although an example in which the two neighbor cells coordinate with each other has been illustrated for convenience of description, the present invention is not limited to the above example. For example, the present invention can be applied to a case in which three or more cells coordinate with each other.

A base station A ($BS_A$) is the base station of a cell A, and a base station B ($BS_B$) is the base station of a cell B. From a viewpoint of a user equipment a (User a1), the cell A is a serving cell, and the cell B is a neighbor cell. From a viewpoint of a user equipment b1 (User b1) and a user equipment b2 (User b2), the cell B is a serving cell, and the cell A is a neighbor cell. The user equipment b1 experiences strong interference from the cell A because it is placed at the boundary of the cell B. The user equipment b2 experiences weak interference from the cell A because it is placed at the center of the cell B. The user equipment a1 can experience strong interference from the cell B because it is placed at the boundary of the cell A. A channel giving strong interference is indicated by a dotted line in FIG. 13, and one of the objects of the present invention is to remove or weaken such interference through coordination between the cells A and B. The user equipment a1, the user equipment b1, and the user equipment b2 can use the same time and the same frequency band, can interfere with each other, and can receive downlink data. The cell A and the cell B can share scheduling information about the time and frequency resources. It is assumed that the cell A is a coordination cell which makes an effort to reduce downlink interference affecting the user equipment b. It is assumed that the cell B is a coordination cell which makes an effort to reduce downlink interference affecting the user equipment a.

The reception rank of the user equipment a is $n_A$. Accordingly, the user equipment a includes an $n_A$ number of reception beam-forming vectors $v_1, v_2, \ldots, v_{nA}$ for combining an $n_A$ number of data, respectively, and includes effective channels $v_1 h_{Aa1}, v_2 h_{Aa1}, \ldots, v_{nA} h_{Aa1}$. The reception beam-forming vectors $v_1, v_2, \ldots, v_{nA}$ can be found by performing SVD on $h_{Aa1}$. The user equipment a1 includes an $n_A$ number of effective channels $v_1 h_{Ba1}, v_2 h_{Ba1}, \ldots, V_{nA} h_{Ba1}$ in the relationship with the cell B. The base station A receives an index, indicating self-aligned beam-forming vectors for the effective channels $v_1 h_{Aa1}, v_2 h_{Aa1}, \ldots, V_{nA} h_{Aa1}$, and an index, indicating neighbor aligned beam-forming vectors for the effective channels $v_1 h_{Ba1}, v_2 h_{Ba1}, \ldots, v_{nA} h_{Ba1}$, from the user equipment a. The base station A transmits the index, indicating the neighbor aligned beam-forming vectors for the effective channels $v_1 h_{Ba1}, v_2 h_{Ba1}, \ldots, v_{nA} h_{Ba1}$ received from the user equipment a1, to the base station B. The base station A and the base station B can consider that an $n_A$ number of the indices received from the user equipment a1 have been respectively received from an $n_A$ number of user equipments each having a reception rank of 1 and uses the embodiments illustrated in FIGS. 10 to 12.

Figure 14:
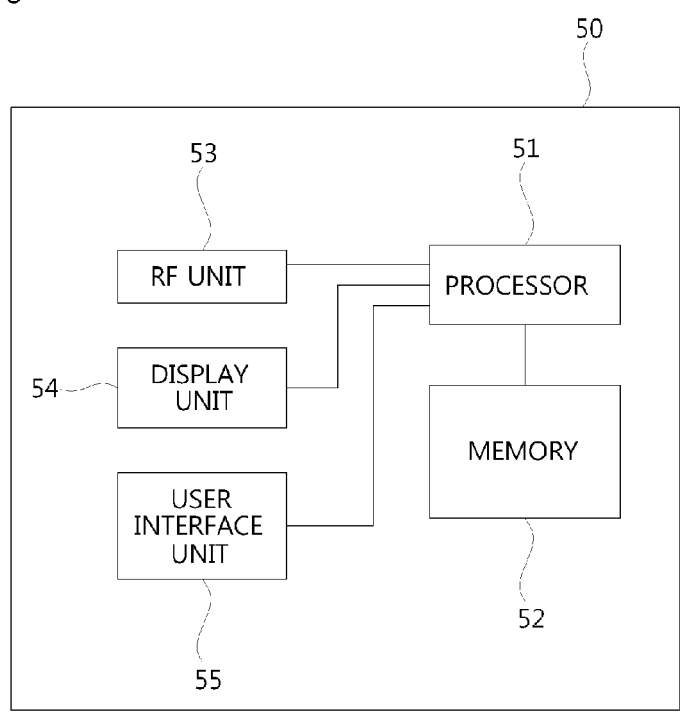
FIG. 14 is a block diagram showing the elements of a user equipment according to another embodiment of the present invention.

FIG. 14 is a block diagram showing the elements of a user equipment according to another embodiment of the present invention. The user equipment 50 includes a processor 51, memory 52, an RF unit 53, a display unit 54, and a user interface unit 55. The memory 52 is coupled to the processor 51 and is configured to store a user equipment driver system, applications, and common files. The display unit 54 displays various pieces of information of the user equipment. A well-known element, such as a Liquid Crystal Display (LCD) or an Organic Light Emitting Diodes (OLED) display, can be used as the display unit 54. The user interface unit 55 can consist of a combination of well-known user interfaces, such as the keypad or the touch screen. The RF unit 53 is coupled to the processor 51 and configured to transmit and receive radio signals. The processor 51 extracts information about a first beam-forming vector which has been aligned with a channel to a neighbor cell based on signals received from the neighbor cell, extracts information about a second beam-forming vector which has been aligned with a channel to a serving cell based on signals received from the serving cell, and transmits the information about the first beam-forming vector and the information about the second beam-forming vector to the base station.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A data transmission method of a base station in a coordinated multi-cell wireless communication system, the data transmission method comprising:
   receiving information about beam-forming vectors, aligned with a channel to a user equipment placed in a neighbor cell, and about nulling beam-forming vectors for the channel to the user equipment from the neighbor cell;
   determining a transmission beam-forming vector based on the information; and
   transmitting the data to the user equipment using the transmission beam-forming vector.

2. The data transmission method of claim 1, wherein the channel is an effective channel in which a reception beam-forming vector of the user equipment has been taken into consideration.

3. The data transmission method of claim 1, wherein the transmission beam-forming vector is selected from the beam-forming vectors orthogonal to the beam-forming vectors aligned with the channel to the user equipment placed in the neighbor cell.

4. The data transmission method of claim 1, wherein the transmission beam-forming vector is determined using Zero Forcing (ZF) beam-forming.

5. The data transmission method of claim 1, wherein the data are received from the neighbor cell, and the data comprise data for the user equipment placed in the neighbor cell.

6. The data transmission method of claim 1, wherein the information about the beam-forming vectors is transmitted by a base station of the neighbor cell or by the user equipment placed in the neighbor cell.

* * * * *